(12) United States Patent
Mojdeh et al.

(10) Patent No.: US 12,691,611 B2
(45) Date of Patent: Jul. 28, 2026

(54) SHELL REMOVAL DEVICE

(71) Applicant: Align Technology, Inc., San Jose, CA (US)

(72) Inventors: Mehdi Mojdeh, Fremont, CA (US); Shiva P. Sambu, Milpitas, CA (US); Dennis McNamara, Walpole, NH (US)

(73) Assignee: Align Technology, Inc., San Jose, CA (US)

( * ) Notice: Subject to any disclaimer, the term of this patent is extended or adjusted under 35 U.S.C. 154(b) by 146 days.

(21) Appl. No.: 17/891,610

(22) Filed: Aug. 19, 2022

(65) Prior Publication Data

US 2022/0410438 A1     Dec. 29, 2022

Related U.S. Application Data

(63) Continuation of application No. 16/662,929, filed on Oct. 24, 2019, now Pat. No. 11,420,362.

(60) Provisional application No. 62/753,743, filed on Oct. 31, 2018.

(51) Int. Cl.
| | |
|---|---|
| *B29C 33/46* | (2006.01) |
| *A61C 13/00* | (2006.01) |
| *B29C 33/00* | (2006.01) |
| *B29C 33/20* | (2006.01) |
| *B29C 33/22* | (2006.01) |

(52) U.S. Cl.
CPC .......... *B29C 33/46* (2013.01); *B29C 33/0038* (2013.01); *B29C 33/202* (2013.01); *B29C 33/22* (2013.01); *A61C 13/0003* (2013.01)

(58) Field of Classification Search
CPC ....... B29C 33/46; B29C 33/202; B29C 33/22; B29C 33/0038; B29C 51/46; B29C 51/44; B29C 51/346; A61C 7/08; A61C 13/0003; B29D 11/00192
See application file for complete search history.

(56) References Cited

U.S. PATENT DOCUMENTS

| | | | | |
|---|---|---|---|---|
| 4,131,596 A | * | 12/1978 | Allen | .................. B29C 45/7653 |
| | | | | 425/149 |
| 4,239,727 A | * | 12/1980 | Myers | ................... B29C 51/002 |
| | | | | 425/398 |
| 5,829,980 A | * | 11/1998 | Sheridan | ................. B29C 51/10 |
| | | | | 433/213 |
| 6,210,162 B1 | | 4/2001 | Chishti et al. | |
| 6,497,574 B1 | | 12/2002 | Miller | |
| 6,957,118 B2 | | 10/2005 | Kopelman et al. | |
| 6,976,627 B1 | | 12/2005 | Culp et al. | |
| 7,092,784 B1 | | 8/2006 | Simkins | |
| 7,220,124 B2 | | 5/2007 | Taub et al. | |
| 7,236,842 B2 | | 6/2007 | Kopelman et al. | |
| 7,245,977 B1 | | 7/2007 | Simkins | |

(Continued)

FOREIGN PATENT DOCUMENTS

| | | |
|---|---|---|
| CN | 203766034 U | 8/2014 |
| CN | 105093374 A | 11/2015 |

*Primary Examiner* — Galen H Hauth
*Assistant Examiner* — Baileigh Kate Darnell
(74) *Attorney, Agent, or Firm* — Lowenstein Sandler LLP

(57) ABSTRACT

A shell removal device includes a platform configured to secure a mold. An untrimmed shell is formed over the mold. The shell removal device further includes a drive mechanism configured to move the platform away from the untrimmed shell responsive to sensor data indicative that the untrimmed shell has begun to separate from the mold.

18 Claims, 18 Drawing Sheets

(56)             References Cited

U.S. PATENT DOCUMENTS

| | | |
|---|---|---|
| 7,261,533 B2 | 8/2007 | Wrosz et al. |
| 7,335,024 B2 | 2/2008 | Wen |
| 7,384,266 B2 | 6/2008 | Wen |
| 7,435,084 B2 | 10/2008 | Liu et al. |
| 7,472,789 B2 | 1/2009 | Wu et al. |
| 7,476,100 B2 | 1/2009 | Kuo |
| 7,481,647 B2 | 1/2009 | Sambu et al. |
| 7,604,181 B2 | 10/2009 | Culp et al. |
| 7,641,828 B2 | 1/2010 | DeSimone et al. |
| 7,648,360 B2 | 1/2010 | Kuo |
| 7,674,422 B2 | 3/2010 | Kuo |
| 7,711,447 B2 | 5/2010 | Lu et al. |
| 7,748,199 B2 | 7/2010 | Sankaran et al. |
| 7,802,987 B1 | 9/2010 | Phan |
| 7,819,659 B2 | 10/2010 | Wen |
| 7,831,322 B2 | 11/2010 | Liu et al. |
| 7,840,373 B2 | 11/2010 | Culp et al. |
| 7,922,490 B2 | 4/2011 | Wen |
| 7,957,824 B2 | 6/2011 | Boronvinskih et al. |
| 8,019,465 B2 | 9/2011 | Spiridonov et al. |
| 8,030,588 B2 | 10/2011 | Culp et al. |
| 8,087,932 B2 | 1/2012 | Liu |
| 8,636,513 B2 | 1/2014 | Wen |
| 8,765,031 B2 | 7/2014 | Li et al. |
| 8,776,391 B1 | 7/2014 | Kaza et al. |
| 9,108,338 B2 | 8/2015 | Sirovskiy et al. |
| 9,403,238 B2 | 8/2016 | Culp |
| 9,943,386 B2 | 4/2018 | Webber et al. |
| 9,943,991 B2 | 4/2018 | Tanugula et al. |
| 10,336,102 B2 | 7/2019 | Cole |
| 10,495,973 B2 | 12/2019 | Cole |
| 10,783,629 B2 | 9/2020 | Parpara et al. |
| 10,888,395 B2 | 1/2021 | Kopelman |
| 11,189,021 B2 | 11/2021 | Shah et al. |
| 11,295,444 B2 | 4/2022 | Cherkas et al. |
| 11,420,362 B2 | 8/2022 | Mehdi et al. |
| 2004/0243361 A1 | 12/2004 | Steuben et al. |
| 2005/0082703 A1* | 4/2005 | Wrosz ..................... A61C 7/08 |
| | | 264/16 |
| 2006/0093982 A1 | 5/2006 | Wen |
| 2006/0093987 A1 | 5/2006 | Wen |
| 2006/0093993 A1 | 5/2006 | Wen |
| 2006/0127850 A1 | 6/2006 | Wen |
| 2006/0127857 A1 | 6/2006 | Zhenhuan et al. |
| 2006/0127858 A1 | 6/2006 | Wen |
| 2006/0127859 A1 | 6/2006 | Wen |
| 2006/0127860 A1 | 6/2006 | Wen |
| 2006/0172250 A1 | 8/2006 | Wen |
| 2006/0199145 A1 | 9/2006 | Liu et al. |
| 2007/0092853 A1 | 4/2007 | Liu et al. |
| 2007/0243502 A1 | 10/2007 | Wen |
| 2008/0083348 A1 | 4/2008 | Kuo et al. |
| 2008/0141534 A1* | 6/2008 | Hilliard ................... A61C 7/02 |
| | | 29/896.11 |
| 2009/0148814 A1 | 6/2009 | Li et al. |
| 2011/0003025 A1* | 1/2011 | Patel ...................... B29C 51/10 |
| | | 425/504 |
| 2013/0255877 A1* | 10/2013 | Wu ......................... H04L 69/16 |
| | | 156/380.9 |
| 2015/0305448 A1* | 10/2015 | Cavaliere ................ B29C 66/54 |
| | | 12/145 |
| 2020/0078137 A1 | 3/2020 | Chen et al. |
| 2020/0214801 A1 | 7/2020 | Wang et al. |
| 2020/0290262 A1 | 9/2020 | Aguilar Mendez et al. |
| 2020/0306017 A1 | 10/2020 | Chavez et al. |
| 2020/0316856 A1 | 10/2020 | Mojdeh et al. |
| 2021/0030516 A1 | 2/2021 | O'Leary et al. |

* cited by examiner

Shell Removal Device 100E

Cover 130E

Clamping Mechanism 170

Untrimmed Shell 150

Platform 120

Mold 140

O-Ring 160A

Body 110

O-Ring 160A

Media Inlet 116

Sidewall 112

Sidewall 112

Shell Removal Device 100F

Mold 110

Untrimmed Shell 150

Platform 120

Body 110

Sidewall 112

Sidewall 112

Mold 140

Dental Arch Portion 142

Gum Line 146

Sloping Portion 144

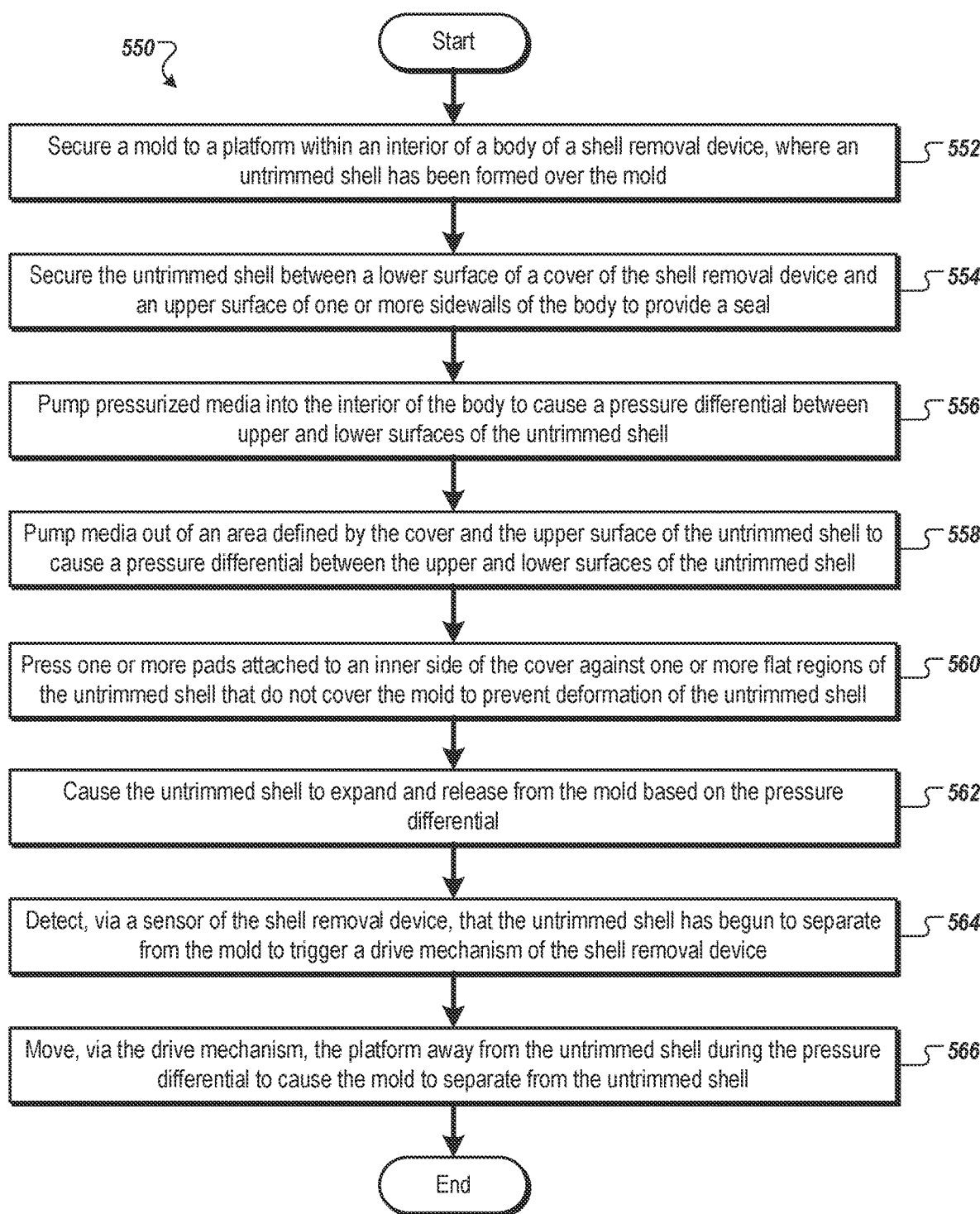

*550*

Start

Secure a mold to a platform within an interior of a body of a shell removal device, where an untrimmed shell has been formed over the mold — 552

Secure the untrimmed shell between a lower surface of a cover of the shell removal device and an upper surface of one or more sidewalls of the body to provide a seal — 554

Pump pressurized media into the interior of the body to cause a pressure differential between upper and lower surfaces of the untrimmed shell — 556

Pump media out of an area defined by the cover and the upper surface of the untrimmed shell to cause a pressure differential between the upper and lower surfaces of the untrimmed shell — 558

Press one or more pads attached to an inner side of the cover against one or more flat regions of the untrimmed shell that do not cover the mold to prevent deformation of the untrimmed shell — 560

Cause the untrimmed shell to expand and release from the mold based on the pressure differential — 562

Detect, via a sensor of the shell removal device, that the untrimmed shell has begun to separate from the mold to trigger a drive mechanism of the shell removal device — 564

Move, via the drive mechanism, the platform away from the untrimmed shell during the pressure differential to cause the mold to separate from the untrimmed shell — 566

End

Figure 7C:
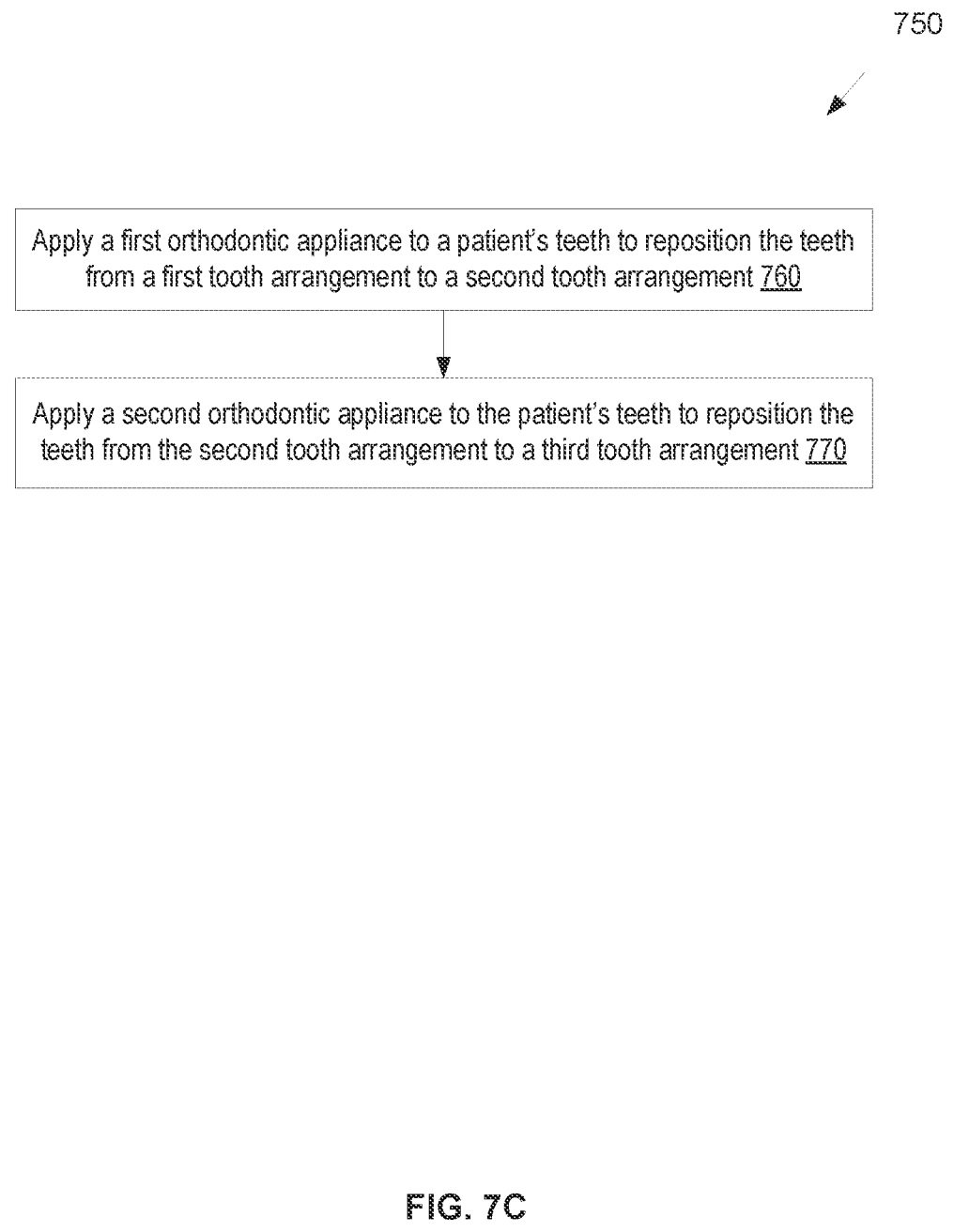

Apply a first orthodontic appliance to a patient's teeth to reposition the teeth from a first tooth arrangement to a second tooth arrangement 760

Apply a second orthodontic appliance to the patient's teeth to reposition the teeth from the second tooth arrangement to a third tooth arrangement 770

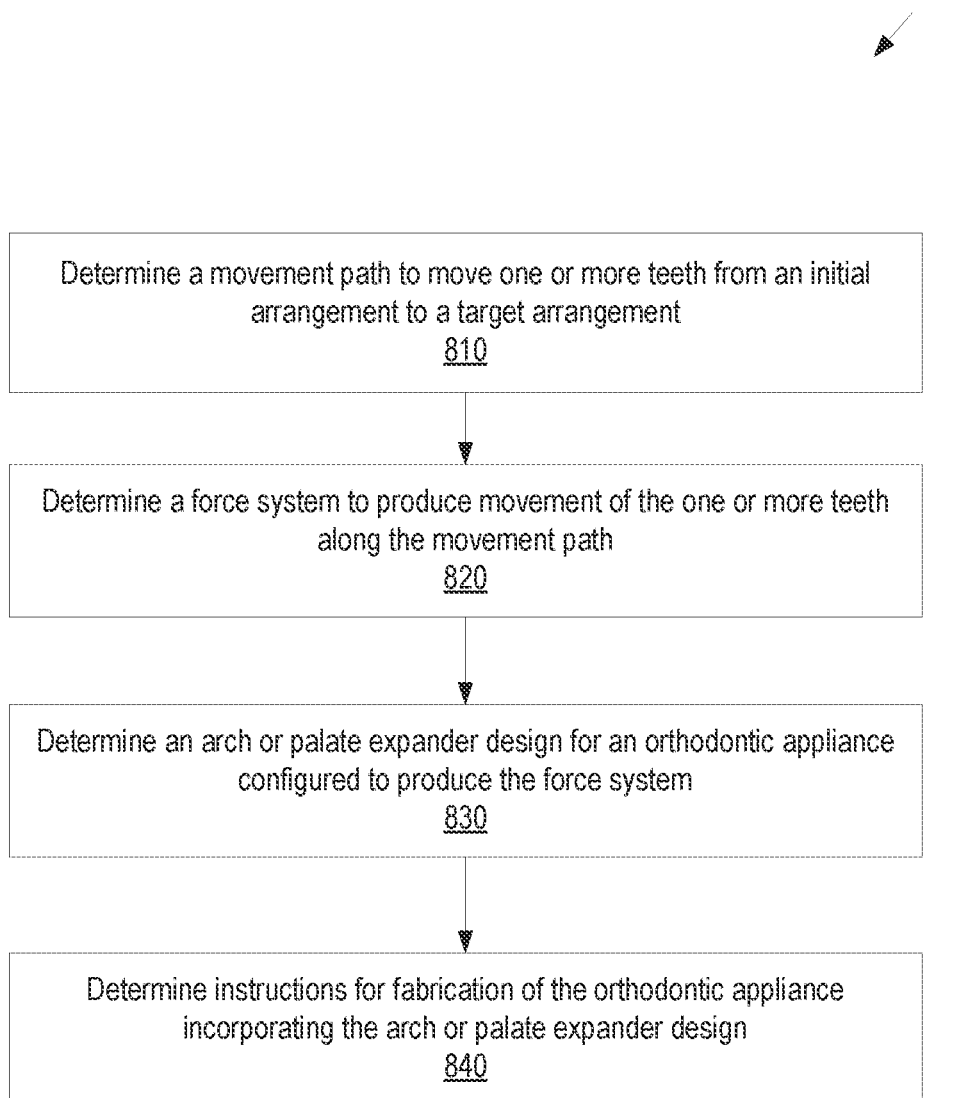

Determine a movement path to move one or more teeth from an initial
arrangement to a target arrangement
810

Determine a force system to produce movement of the one or more teeth
along the movement path
820

Determine an arch or palate expander design for an orthodontic appliance
configured to produce the force system
830

Determine instructions for fabrication of the orthodontic appliance
incorporating the arch or palate expander design
840

Receive a digital representation of a patient's teeth
910

Generate one or more treatment stages based on the digital representation of the teeth
920

Fabricate at least one orthodontic appliance based on the generated treatment stages
930

SHELL REMOVAL DEVICE

RELATED APPLICATION

This application claims the benefit of Non-Provisional application Ser. No. 16/662,929, filed Oct. 24, 2019, which claims the benefit if Provisional Application No. 62/753, 743, filed Oct. 31, 2018, the entire content of which are incorporated by reference herein.

TECHNICAL FIELD

Embodiments of the present invention relate to the field of aligners and, in particular, to automating removal of an aligner from a mold.

BACKGROUND

For some applications, shells are formed around molds to achieve a negative of the mold. The shells are then removed from the molds to be further used for various applications. One example application in which a shell is formed around a mold and then later used is corrective dentistry or orthodontic treatment. In such an application, the mold is of a dental arch for a patient and the shell is an aligner to be used for aligning one or more teeth of the patient.

Molds may be formed using rapid prototyping equipment such as 3D printers, which may manufacture the molds using additive manufacturing techniques (e.g., stereolithography) or subtractive manufacturing techniques (e.g., milling).The aligners may then be formed over the molds using thermoforming equipment. Once the aligner is formed, the aligner is typically trimmed and then manually removed from the mold. To remove the aligner from the mold, a user typically uses a hand tool to separate the aligner from the mold. Depending on the complexity of the aligner (e.g., teeth overcrowding, overhangs, number of attachments), it may be difficult to remove the aligner from the mold, which may result in breakage of the aligner and other quality issues (e.g., deformation, bending, etc.) in the manual removal process.

Laboratories, manufacturers, dentist offices or orthodontics offices may use rapid prototyping equipment and thermoforming equipment to automate portions of the aligner production process. However, such laboratories, dentist offices, manufacturers, orthodontics offices, etc. may manually remove each aligner from a corresponding mold in a matter that causes a bottleneck in the aligner production process and may damage the aligner.

BRIEF DESCRIPTION OF THE DRAWINGS

The present invention is illustrated by way of example, and not by way of limitation, in the figures of the accompanying drawings.

FIG. 5B illustrates a flow diagram for a method of removing an untrimmed shell from a mold, according to certain embodiments.

FIG. 7C illustrates a method of orthodontic treatment using a plurality of appliances, according to certain embodiments.

FIG. 8 illustrates a method for designing an orthodontic appliance, according to certain embodiments.

DETAILED DESCRIPTION

Figure 1A:
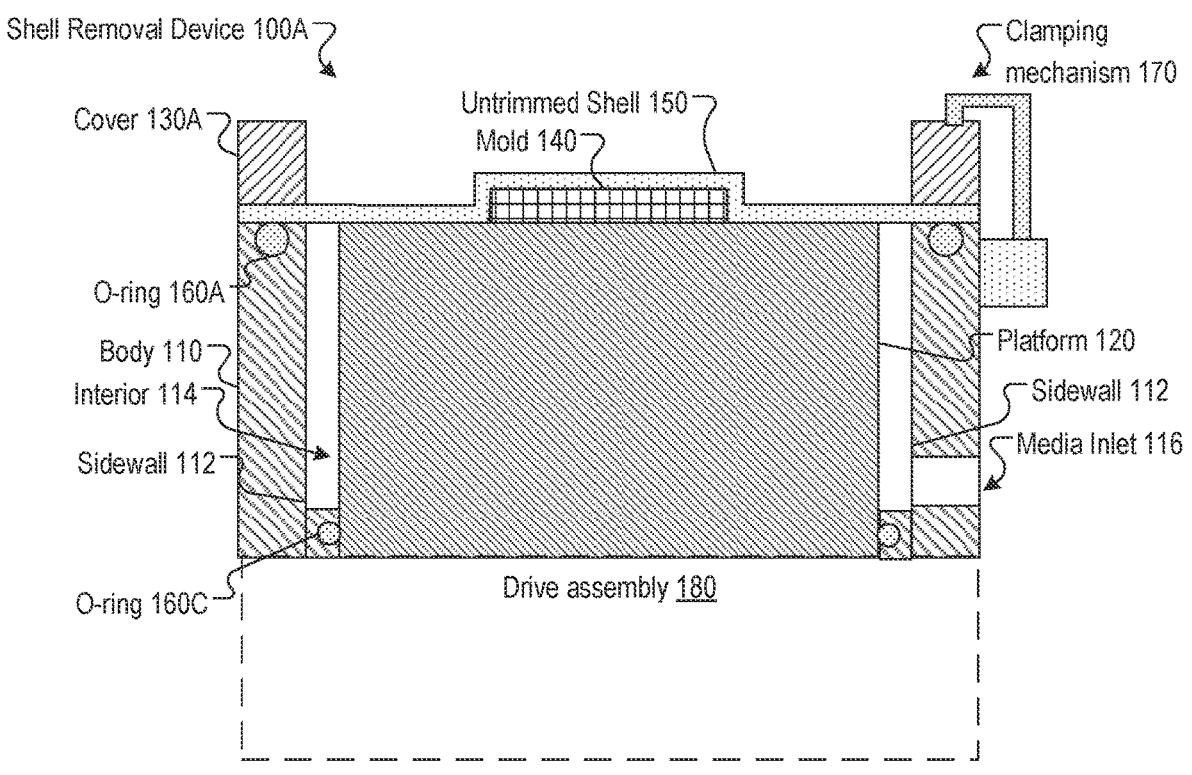
FIG. 1A illustrates a cross-sectional view of a shell removal device including a media inlet, according to certain embodiments.

Described herein are embodiments of automated removal of a polymeric aligner (also referred to as an aligner, a shell, a plastic aligner, a plastic shell, an appliance and an orthodontic appliance) from a mold. Portions of aligner production may be automated. Automation of processes in aligner production can increase speed of production, decrease inaccuracies, decrease damage to the aligner, increase efficacy of the aligner, and increase comfort of the patient. Aligners may be manufactured by thermoforming a plastic sheet over a mold of a dental arch. Traditionally in aligner production, removal of the aligner from the mold is a manual process, which is performed after the aligner has been trimmed along a gingival line. A user may manually insert a hand tool between the aligner and the mold to separate the aligner from the mold. Manual removal of the aligner from the mold may damage or break the aligner, may cause quality issues (e.g., deformed or bent aligners), and may be a bottleneck in aligner production. The more complex a mold is, the more difficult it may be to remove an aligner from the mold, the more time removal of the aligner from the mold may take, and the more likely that removal is to result in an aligner that is damaged or has other quality issues.

Embodiments described herein enable automated removal of an untrimmed aligner from a mold. Automated removal of an untrimmed aligner from a mold may include applying a pressure differential between an upper surface of the untrimmed aligner and a lower surface of the untrimmed aligner. Automated removal of the untrimmed aligner from a mold may further include attaching the mold to a platform and moving the platform away from the untrimmed aligner during application of the pressure differential. Automated removal of the untrimmed aligner may further include pressing one or more pads against flat regions of the untrimmed aligner that do not cover the mold to prevent damage of the untrimmed aligner during application of the pressure differential. The automated removal of the aligner from the mold may increase speed of aligner production, decrease aligner inaccuracies, decrease damaged aligners, increase efficacy of the aligners, and decrease quality issues of aligners.

In some embodiments, a mold is secured to a platform of a shell removal device, where an untrimmed shell has been formed over the mold. A body of the shell removal device includes one or more sidewalls that enclose an interior of the body and the platform is disposed in the interior of the body. The sides of the untrimmed shell may extend over the one or more sidewalls of the body. The untrimmed shell is secured between a lower surface of a cover and an upper surface of the one or more sidewalls of the body to provide a seal between the untrimmed shell and the shell removal device. A pressure differential between an upper surface of the untrimmed shell and a lower surface of the untrimmed shell is caused by at least one of pumping a pressurized media into the interior of the body or pumping media out of an area defined by the cover and an upper surface of the untrimmed shell. The untrimmed shell is caused to expand and release from the mold based on the pressure differential.

In some embodiments, a shell removal device includes a body, a platform disposed within an interior of the body, a cover, and a media inlet in the body. The body may include one or more sidewalls that enclose the interior of the body. The platform may be configured to secure a mold that has an untrimmed shell formed over the mold. One or more portions of the untrimmed shell may extend over the one or more sidewalls of the body. The cover may be configured to secure the untrimmed shell to an upper surface of the one or more sidewalls of the body and provide a seal between a lower surface of the untrimmed shell and the upper surface of the one or more sidewalls of the body. The media inlet may permit pressurized media into the interior of the body to cause a pressure differential between an upper surface of the untrimmed shell and the lower surface of the untrimmed shell. The pressure differential may cause the untrimmed shell to expand and release from the mold.

In some embodiments, a shell removal device includes a body, a platform disposed within an interior of the body, a cover, and a media outlet in the cover. The body may include one or more sidewalls that enclose the interior of the body. The platform may be configured to secure a mold that has an untrimmed shell formed over the mold. One or more portions of the untrimmed shell may extend over the one or more sidewalls of the body. The cover may be configured to secure the untrimmed shell to an upper surface of the one or more sidewalls of the body and provide a seal between an upper surface of the untrimmed shell and a lower surface of the cover. The media outlet may permit media to be removed from an area defined by the cover and the upper surface of the untrimmed shell to cause a pressure differential between the upper surface of the untrimmed shell and the lower surface of the untrimmed shell. The pressure differential may cause the untrimmed shell to expand and release from the mold.

Some embodiments are discussed herein with reference to orthodontic aligners (also referred to simply as aligners). However, embodiments also extend to other types of shells formed over molds, such as orthodontic retainers, orthodontic splints, sleep appliances for mouth insertion (e.g., for minimizing snoring, sleep apnea, etc.) and/or shells for non-dental applications. Accordingly, it should be understood that embodiments herein that refer to aligners also apply to other types of shells. For example, the principles, features and methods discussed may be applied to any application or process in which it is useful to automate removal of a shell from a mold, where the shell is a form fitting device such as eye glass frames, contact or glass lenses, hearing aids or plugs, artificial knee caps, prosthetic limbs and devices, orthopedic inserts, as well as protective equipment such as knee guards, athletic cups, or elbow, chin, and shin guards and other like athletic/protective devices.

FIG. 1A illustrates a cross-sectional view of a shell removal device 100A including a media inlet 116, according to certain embodiments.

Shell removal device 100A may include a body 110, a platform 120, and a cover 130A. The body may include one or more sidewalls 112 that enclose an interior 114 of the body 110. The platform 120 may be disposed within the interior 114 of the body 110. The platform 120 may secure a mold 140 that has an untrimmed shell 150 (e.g., an untrimmed aligner) formed over the mold 140. In some embodiments, the mold 140 corresponds to a dental arch of a patient and the mold 140 includes a sloping portion that commences below a gum line of the dental arch and extends away from the dental arch to a lower portion of the mold 140 (see FIG. 1G) to assist with removal of the untrimmed shell 150 from the mold 140. One or more portions of the untrimmed shell 150 may extend over the one or more sidewalls 112 of the body 110 (e.g., may extend over interior sidewalls of the body 110 and/or may extend over exterior sidewalls of the body 110). The cover 130A may be configured to secure the untrimmed shell 150 to an upper surface of the one or more sidewalls 112 and provide a seal between a lower surface of the untrimmed shell 150 and the upper surface of the one or more sidewalls 112 of the body 110. The cover 130A may include one or more pads (not shown) attached to an inner surface of the cover 130A. The pads may be positioned to press against one or more flat regions of the untrimmed shell 150 that do not cover the mold 140 to prevent damage of the untrimmed shell 150 during application of a pressure differential. The media inlet 116 in the body 110 may permit pressurized media into the interior of the body 110 to cause a pressure differential between an upper surface of the untrimmed shell 150 and the lower surface of the untrimmed shell 150 (e.g., to inflate the untrimmed shell 150). The pressure differential may cause the untrimmed shell 150 to expand and release from the mold 140. Pressurized media may include one or more of pressurized air (e.g., compressed air), pressurized water, pressurized steam, pressurized gas (e.g., pressurized inert gas), pressurized liquid (e.g., pressurized non-reactive liquid), etc.

The shell removal device 100A may include one or more O-rings 160A. Although O-rings 160A are discussed herein, any component that provides a seal can be used. The O-ring 160A may include one or more of a mechanical gasket, an elastomer, a packing, a toric joint, a seal, a washer, etc. Each O-ring 160A may be seated in a groove and compressed during assembly between two or more parts (e.g., between the upper surface of the body 110 and the lower surface of the untrimmed shell 150 in FIGS. 1A-E, between the upper surface of the untrimmed shell 150 and the lower surface of the cover 130 in FIGS. 1B-D, between the body 110 and the platform 120 in FIGS. 1C-D, etc.).

An O-ring 160A may be disposed on the upper surface of the one or more sidewalls 112 of the body 110. A clamping mechanism 170 may press the cover 130 against the one or more portions of the untrimmed shell that extend over the one or more sidewalls of the body and to further press the one or more portions of the untrimmed shell 150 against the O-ring 160A on the upper surface of the one or more sidewalls 112 of the body 110 to create the seal. In some embodiments, the clamping mechanism 170 presses against an upper surface of the cover 130. For example, the clamp-ing mechanism 170 may be a c-clamp. In some embodi-ments, the clamping mechanism 170 is a first component of the cover 130 and a second component of the body 110 that engage with each other. For example, the clamping mecha-nism 170 may include one or more keyhole slots in cover 130 and one or more corresponding components in body 110 (e.g., a screw, bolt, protrusion) that engage with each other (e.g., clamping mechanism 170 in FIG. 4A).

The shell removal device 100A may include one or more O-rings 160C. Although O-rings 160C are discussed herein, any component that provides a seal can be used. The O-ring 160C may include one or more of a mechanical gasket, an elastomer, a packing, a toric joint, a seal, a washer, etc. Each O-ring 160C may be seated in a groove and compressed during assembly between two or more parts (e.g., between the body 110 and the platform 120, between the grove proximate the sidewall 112 and the platform 120, etc.). The O-rings 160A and 160C may provide a seal to be able to create a pressure differential between the upper and lower surfaces of the untrimmed shell 150.

The shell removal device 100 may further include a drive assembly 180 including a drive mechanism 186 to move the platform 120 away from the untrimmed shell 150 during the pressure differential to cause the mold 140 to separate from the untrimmed shell 150. The shell removal device 100 may further include a sensor (e.g., an optical sensor, audio sensor, etc.) to detect when the untrimmed shell 150 has begun to separate from the mold 140 (e.g., detect change in contrast between the transparent untrimmed shell 150 and the mold 140) and to trigger the drive mechanism 186 after detecting that the untrimmed shell 150 has begun to separate from the mold 140.

In some embodiments, a sensor may detect that the untrimmed shell 150 has begun to separate from the mold 140 (e.g., at least a portion of the untrimmed shell 150 has moved a threshold distance away from the mold 140 and/or platform 120). For example, the sensor may be an optical sensor that senses a change in contrast (e.g., the transparent untrimmed shell 150 has moved a threshold distance from the mold 140). In some instances, a sensor may detect a pressure or pressure differential. The sensor may include one or more of a piezoelectric pressure transducer, a strain gauge pressure sensor, a variable capacitance pressure transducer, etc. The sensor may trigger the drive mechanism 186 to begin moving the platform away from the mold (e.g., responsive to detecting the untrimmed shell 150 has begun to separate from the mold 140, responsive to detecting a pressure or pressure differential, etc.). In another example, the sensor may be an audio sensor that senses an audible indication that the untrimmed shell 150 has at least partially separated from the mold 140 (e.g., a popping sound from at least a portion of the untrimmed shell 150 disengaging from the mold 140).

Figure 1B:
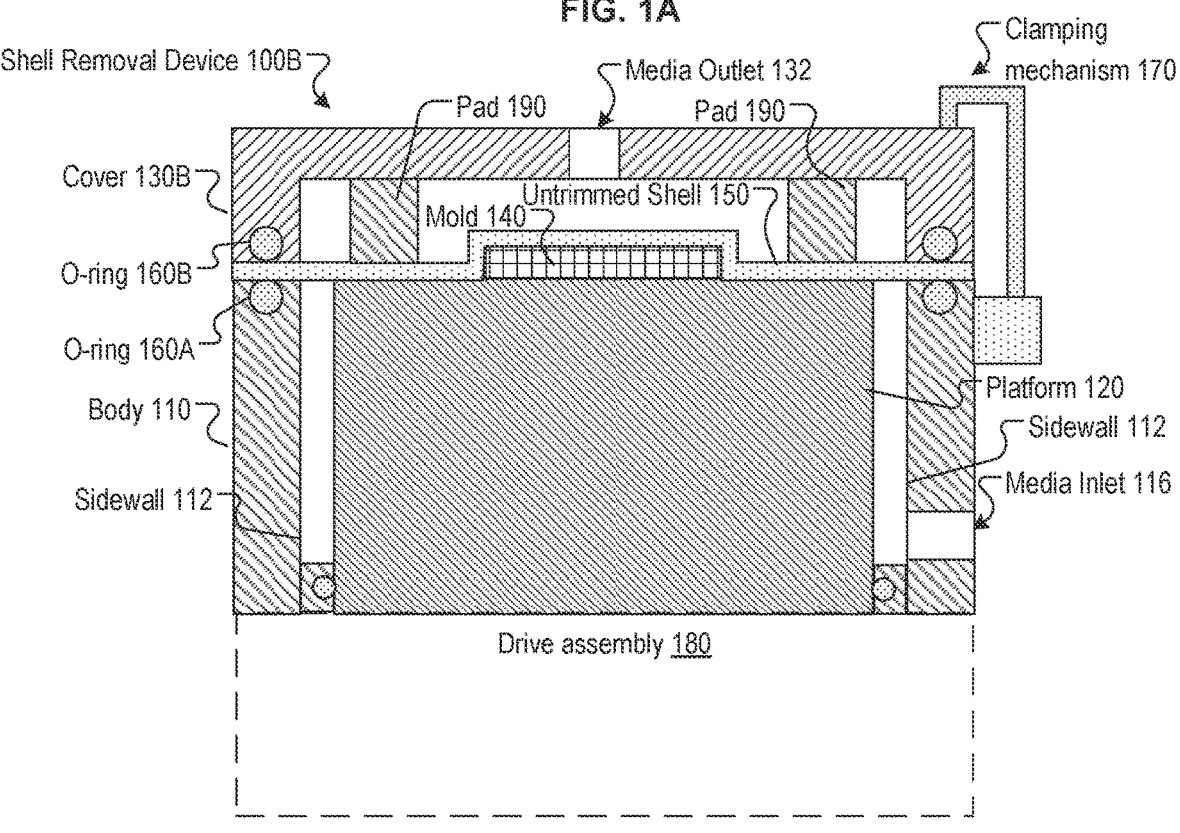
FIG. 1B illustrates a cross-sectional view of a shell removal device including a media outlet, according to certain embodiments.

FIG. 1B illustrates a cross-sectional view of a shell removal device 100B including a media outlet 132, accord-ing to certain embodiments.

In some embodiments, a cover 130B may extend over the untrimmed shell 150 formed over the mold 140. For example, the cover 130B may be a sealed cap or dome. A media outlet 132 in the cover 130B may permit media to be removed from an area defined by the cover 130B and the upper surface of the untrimmed shell 150 to cause a pressure differential between the upper and lower surfaces of the untrimmed shell 150.

The shell removal device 100B may include an O-ring 160B on the lower surface of the cover 130. Although O-rings 160B are discussed herein, any component that provides a seal can be used. The O-ring 160B may include one or more of a mechanical gasket, an elastomer, a packing, a toric joint, a seal, a washer, etc. Each O-ring 160B may be seated in a groove and compressed during assembly between two or more parts. The clamping mechanism 170 may press the cover 130 against the one or more portions of the untrimmed shell that extend over the one or more sidewalls 112 of the 110 body and further press the one or more portions of the untrimmed shell 150 against the O-ring 160B on the lower surface of the cover 130B to create the seal.

The shell removal device 100B may include one or more pads 190 (e.g., components made of compressible material, inflatable objects, etc.) attached to an inner surface of the cover 130. The pads 190 may be positioned to press against one or more flat regions of the untrimmed shell that do not cover the mold 140 to prevent damage of the untrimmed shell 150 during application of the pressure differential. In some embodiments, the pads 190 may compress against the one or more flat regions. In some embodiments, the pads 190 may inflate to press against the one or more flat regions. In some embodiments, a shell removal device that does not include a cover 130B that is a sealed cap or dome may also include one or more pads 190 (e.g., pads 390 in FIG. 3, pad 490 in FIG. 4A).

In some embodiments, a shell removal device 100A-B includes a media inlet 116 to cause a positive pressure under the untrimmed shell 150 and does not include a media outlet 132. In some embodiments, the shell removal device 100A-B includes a media outlet 132 to cause a negative pressure above the untrimmed shell 150 and does not include a media inlet 116. In some embodiments, the shell removal device 100A-B includes both a media inlet 116 to cause a positive pressure below the untrimmed shell 150 and a media outlet 132 to cause a negative pressure above the untrimmed shell 150. In some embodiments, the shell removal device 100 may alternatively provide positive pres-sure via the media inlet 116 and/or negative pressure via the media outlet 132 (e.g., not at the same time). In some embodiments, the shell removal device 100A-B may simul-taneously provide positive pressure via the media inlet 116 and negative pressure via the media outlet 132.

The shell removal device 100A-B may include one or more pumps. In some instances, one or more pumps (e.g., air compressor) may force the pressurized media through the media inlet 116 into the interior 114 of the body 110 to cause the pressure differential between the upper and lower sur-faces of the untrimmed shell 150. In some instances, one or more pumps (e.g., suction pump) may pump (via the media outlet 132) media (e.g., air) out of the area defined by the cover 130 and an upper surface of the untrimmed shell 150 to cause the pressure differential between the upper and lower surfaces of the untrimmed shell 150. In some instances, the same one or more pumps (e.g., a single pump) may pump media (via the media outlet 132) out of the area defined by the cover 130 and the upper surface of the untrimmed shell 150 and pump media (via the media inlet 116) into the interior of the 114 of the body 110 (e.g., simultaneously pump out of the area and pump into the interior of the body 110) to cause the pressure differential between the upper and lower surfaces of the untrimmed shell 150.

Although a shell removal device 100A is illustrated in FIG. 1A and a different shell removal device 1008 is illustrated in FIG. 1B with different features, a shell removal device may include any combination of features illustrated in FIGS. 1A-F, FIGS. 2A-C, FIG. 3, and FIGS. 4A-B. For example, a shell removal device may include a media outlet 132 and no media inlet 116. In another example, a shell removal device may include a media outlet 132 and no pads 190. In another example, a shell removal device may include a media inlet 116, pads 190, and no media outlet 132.

Figures 1C, 1D:
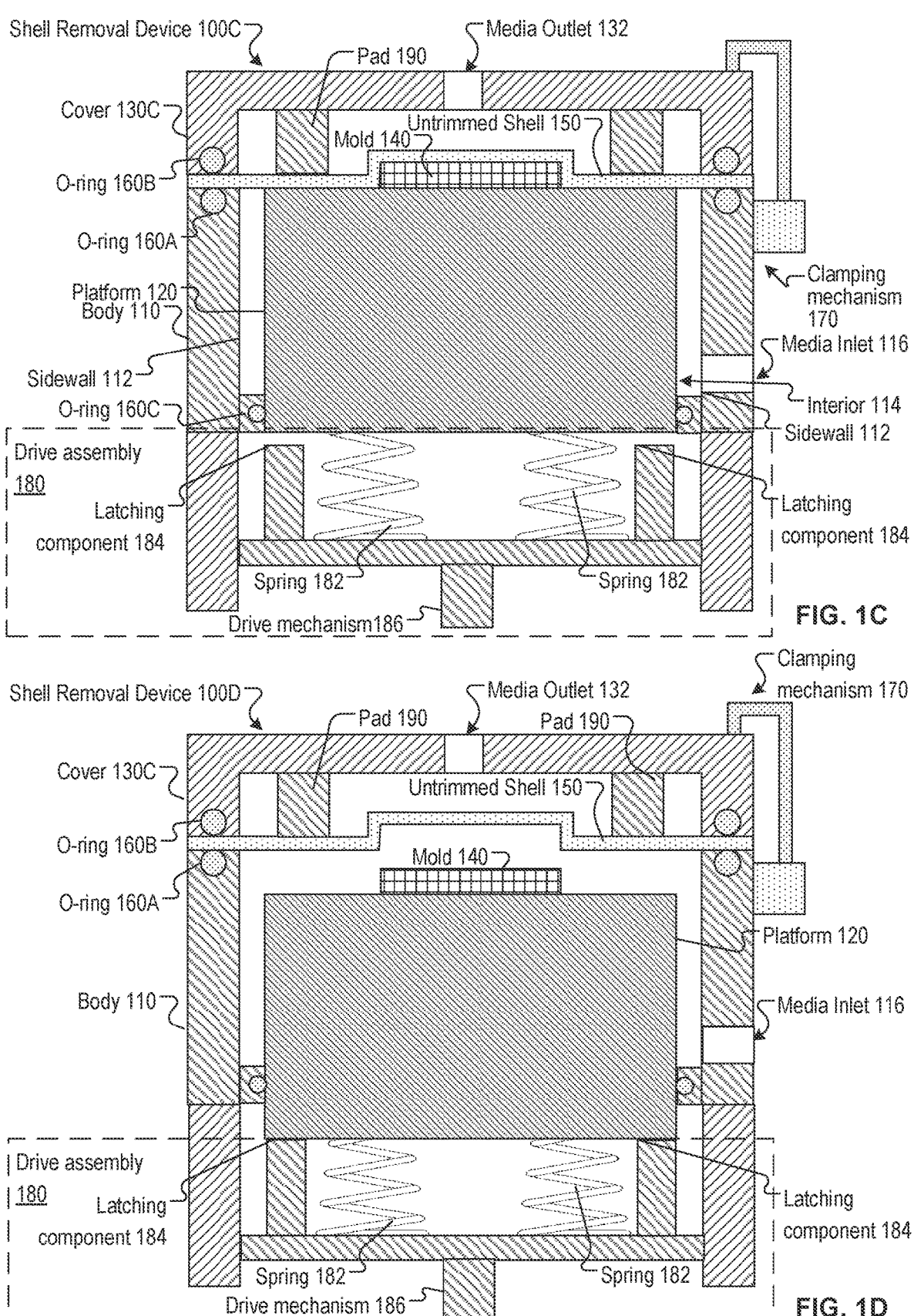
FIGS. 1C-D illustrate cross-sectional views of a shell removal device including a drive mechanism, according to certain embodiments.

FIGS. 1C-D illustrate cross-sectional views of a shell removal device 100C-D including a drive assembly 180, according to certain embodiments. The drive assembly 180 may be a second platform that contains or is connected to platform 120. FIG. 1C may illustrate shell removal device 100C with a platform 120 in a raised position (e.g., prior to pumping pressurized media into the interior 114 of the body 110). FIG. 1D may illustrate a shell removal device 100D that is the same as shell removal device 100C in FIG. 1C except that the platform 120 is a lowered position (e.g., after pumping pressurized media into the interior 114 of the body 110).

In some embodiments, a drive assembly 180 is disposed below the platform 120. In some embodiments, the media inlet 116 forces pressurized media into the interior 114 of the body 110 between one or more inner sidewalls 112 of the body and one or more outer sidewalls of the platform 120. In some embodiments, the drive assembly 180 is hermetically separated from the interior 114 of the body 110 (e.g., via O-ring 160C).

The drive assembly 180 may include a drive mechanism 186. In some embodiments, the drive mechanism 186 may lower the platform 120. In some embodiments, the drive mechanism 186 may lower the platform 120 responsive to the untrimmed shell 150 beginning to separate from the mold 140 (e.g., the untrimmed shell 150 moving a threshold distance from the mold 140). In some embodiments, the drive mechanism 186 may lower the platform 120 responsive to one or more of a threshold positive pressure being applied below the untrimmed shell 150, a threshold negative pressure being applied above the untrimmed shell 150, or a threshold pressure differential being applied between the upper and lower surfaces of the untrimmed shell 150.

As illustrated in FIGS. 1C-D, the drive assembly 180 may include one or more springs 182 (e.g., coils, etc.) and one or more latching components 184 (e.g., electromagnet, etc.). The platform 120 may be disposed on the springs 182. Responsive to pressurized media entering the interior 114 of the body 110 (e.g., between the sidewalls 112 and the platform 120, inside the platform 120, etc.), the mold 140 may begin to separate from the untrimmed shell 150. Responsive to the mold 140 beginning to separate from the untrimmed shell, the platform 120 may begin to lower. For example, the pressurized media exert a force between the untrimmed shell 150 and mold 140 that is higher than the pressure exerted by the springs 182 of the drive assembly 180 and may cause the platform to lower. In another example, the pressurized media plus the weight of the platform 120 may exert a force that is greater than the force of the springs 182 and may cause the platform 120 to lower. Upon lowering a threshold distance (e.g., 0.2 millimeters (mm)), the platform 120 may engage with a latching component 184 which will maintain the platform 120 in the lowered position even after the interior 114 of the body 110 is no longer pressurized with media.

In some embodiments, a sensor may be disposed proximate one or more springs 182 and one or more latching components 184. The sensor may detect that the platform 120 has engaged with one or more latching components 184 (e.g., has descended to be proximate one or more latching components 184). The sensor may trigger the drive mechanism 186 to pull the platform 120, latching components 184, and springs 182 away from the shell. The drive component 186 may maintain the latching components 184 and the bottom surface of the springs 182 stationary (not moving vertically) until the sensor triggers the drive component to lower the platform, springs 182, and latching components 184. Upon depressurizing the interior 114 of the body 110, the cover 130C may be removed and the untrimmed shell 150 that is separated from the mold 140 may be removed from the shell removal device.

Although FIGS. 1C-D illustrate springs 182 and latching components 184, in some embodiments, the drive assembly 180 may not include springs 182 and latching components 184.

The drive assembly 180 may include one or more types of drive mechanisms 186 that lower the platform 120. In some implementations, the drive assembly 180 includes a pneumatic drive mechanism 186. In some implementations, the drive assembly 180 includes a threaded drive mechanism 186 (e.g., a screw drives the platform 120 up and down). In some embodiments, the drive assembly 180 includes a motorized drive mechanism 186.

Figure 1E:
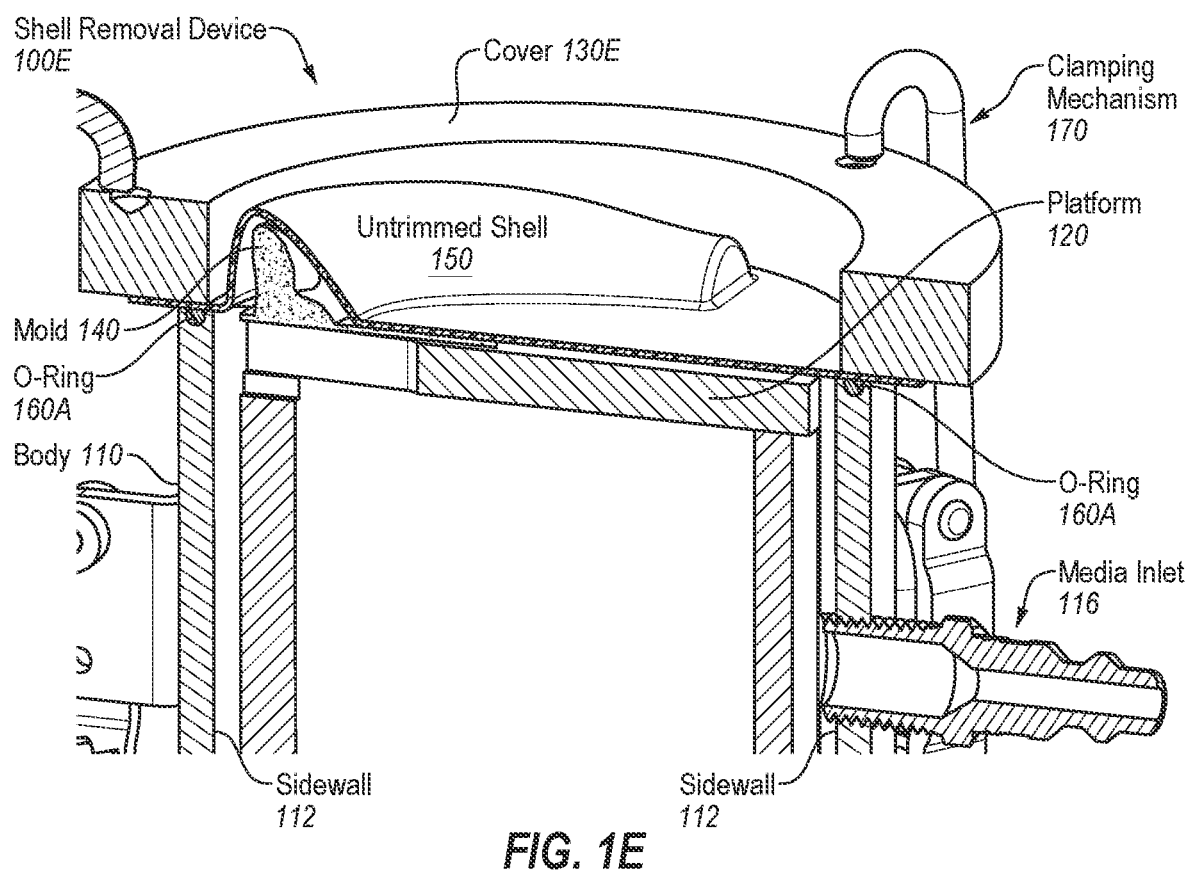
FIG. 1E illustrates a cross-sectional perspective view of a shell removal device, according to certain embodiments.

FIG. 1E illustrates a cross-sectional perspective view of a shell removal device 100E, according to certain embodiments. As illustrated in FIG. 1E, the body 110 may be a hollow cylindrical body, the platform 120 may include a cylinder, and the cover 130E may include a ring that has a first diameter that approximately matches the second diameter of the hollow cylindrical body. In some embodiments, media may be pumped via the media inlet 116 into the space between the inner cylindrical sidewall 112 of the body and the outer cylindrical sidewall of the platform to cause the untrimmed shell 150 and the mold 140 to begin to separate. In some embodiments, the platform 120 may be perforated or slotted and the media may be pumped via the media inlet 116 and through the perforations of the platform 120 to cause the untrimmed shell 150 and the mold to separate. In some embodiments the body 110, platform 120, and cover 130E are cylindrical and the untrimmed shell 150 has a circular perimeter. In some embodiments the inner and/or outer perimeter of the body 110, platform 120, and cover 130 are each a first shape (e.g., trapezoid, rectangle, square, triangle, etc.) and the perimeter of the untrimmed shell 150 is also the first shape (e.g., the perimeters of the body 110, platform 120, cover 130, and untrimmed shell 150 are all the same shape).

The pumping of the media via the media inlet 116 may cause a pressure differential between the lower and upper surfaces of the untrimmed shell 150, which causes the untrimmed shell 150 to raise relative to the platform 120 and mold 140 (e.g., the mold 140 is secured to the platform, so the untrimmed shell 150 raises relative to the mold 140 as well). As the untrimmed shell 150 begins to separate, the platform 120 (e.g., and mold 140 secured to the platform 120) may begin to lower as shown in FIG. 1F.

Figure 1F:
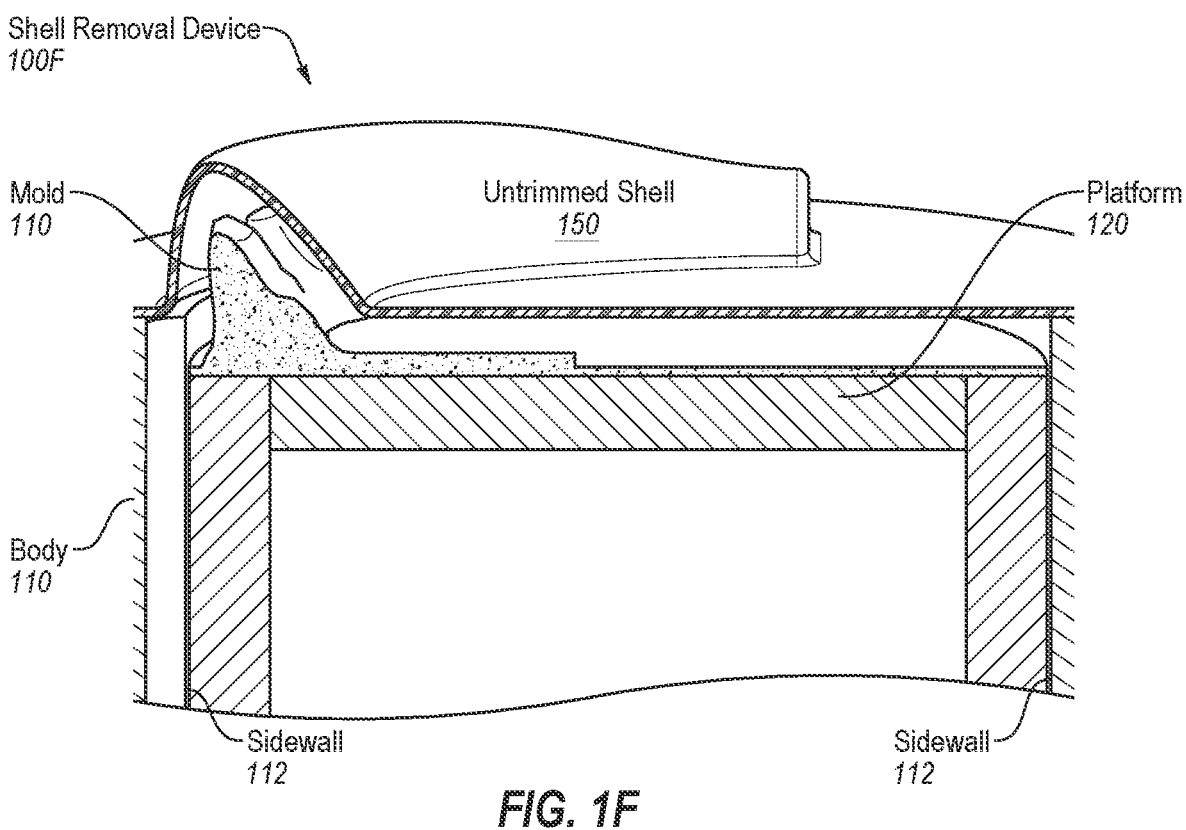
FIG. 1F illustrates a cross-sectional view of a shell removal device including a lowered platform, according to certain embodiments.

FIG. 1F illustrates a cross-sectional view of a shell removal device 100F including a lowered platform 120, according to certain embodiments. FIG. 1E may illustrate shell removal device 100E with a platform 120 in a raised position (e.g., prior to pumping pressurized media into the interior 114 of the body 110), and FIG. 1F may illustrate a shell removal device 100F that is the same as shell removal device 100E in FIG. 1E except that the platform 120 is a lowered position (e.g., after pumping pressurized media into the interior 114 of the body 110). In some embodiments, upon the untrimmed shell 150 beginning to separate from the mold 140 due to the pressure differential, the shell removal device 100 may lower the platform 120 via a drive mechanism. After removing the pressurized media, the untrimmed shell 150 does not reattach to the mold since the platform 120 is in a lowered position.

Figure 1G:
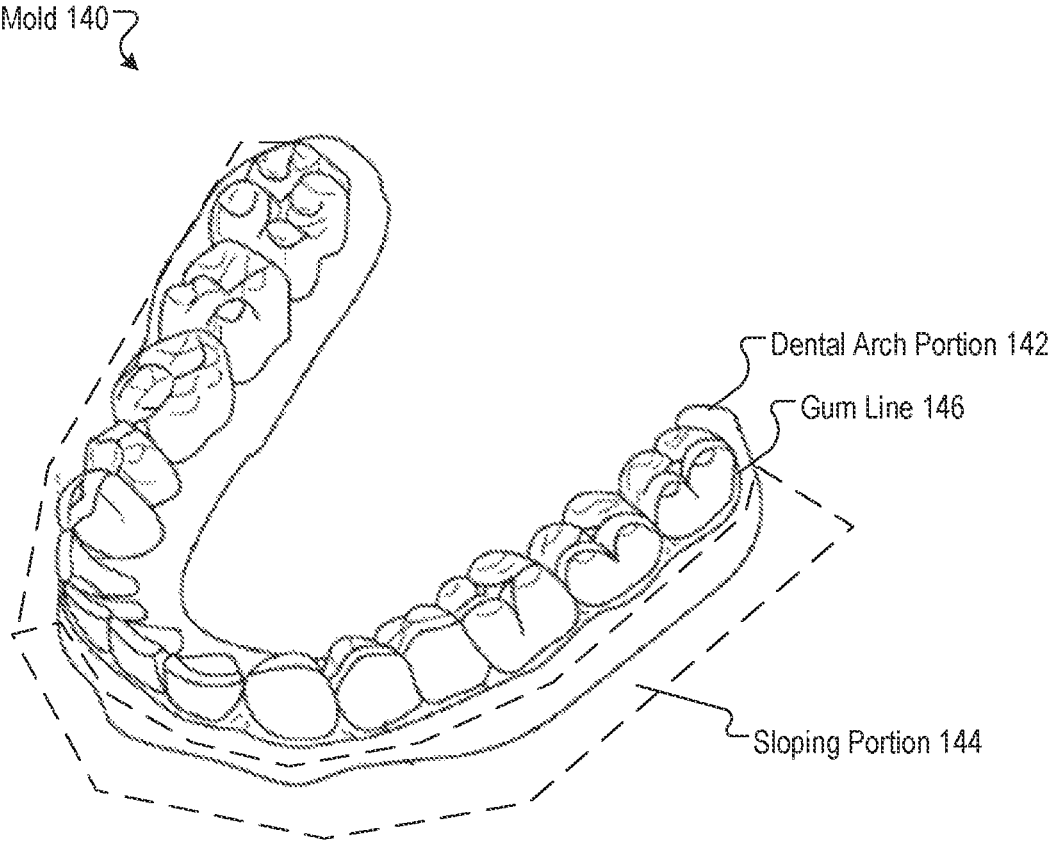
FIG. 1G illustrates a mold for use in a shell removal device, according to certain embodiments.

FIG. 1G illustrates a mold 140 for use in a shell removal device 100, according to certain embodiments. The mold 140 may correspond to a dental arch of a patient. The mold 140 may include a dental arch portion 142 and a sloping portion 144. The dental arch portion 142 and the sloping portion 144 may form one continuous mold. The dental arch portion 142 may include teeth that correspond to a plurality of teeth of the patient and gum line 146 that corresponds to the gum line of the patient (e.g., gingival line, where the gums and the teeth meet). The sloping portion 144 may commence below the gum line 146 and may extend away from the dental arch to a lower portion of the mold 140. A portion of the untrimmed shell 150 that is disposed on the sloping portion 144 of the mold 140 is to be trimmed to generate an aligner. The sloping portion 142 of the mold 140 may assist in the release of the untrimmed shell 150 from the mold 140.

Figure 2A:
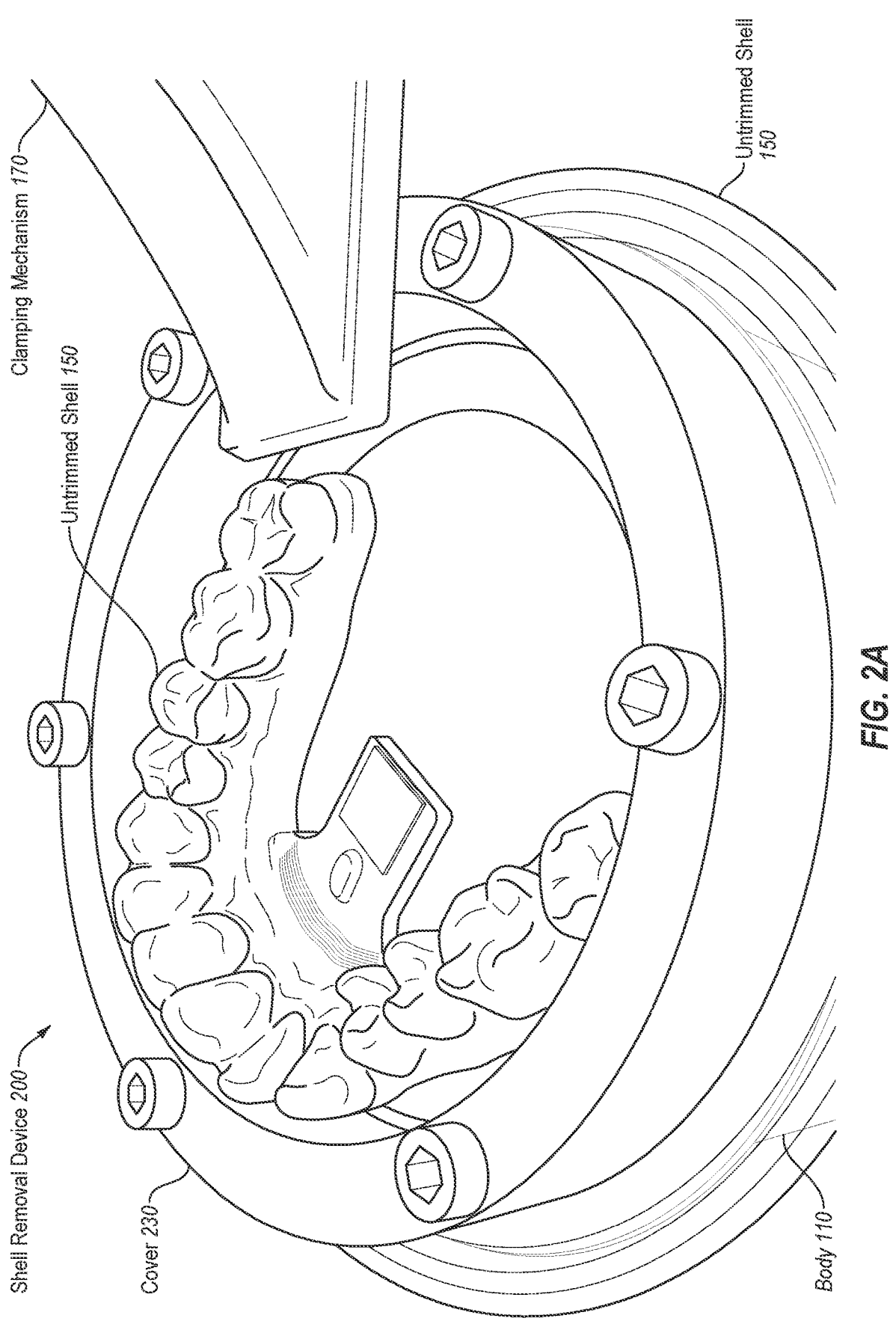
FIGS. 2A-C illustrate a shell removal device causing an untrimmed shell to release from a mold, according to certain embodiments.
Figure 2B:
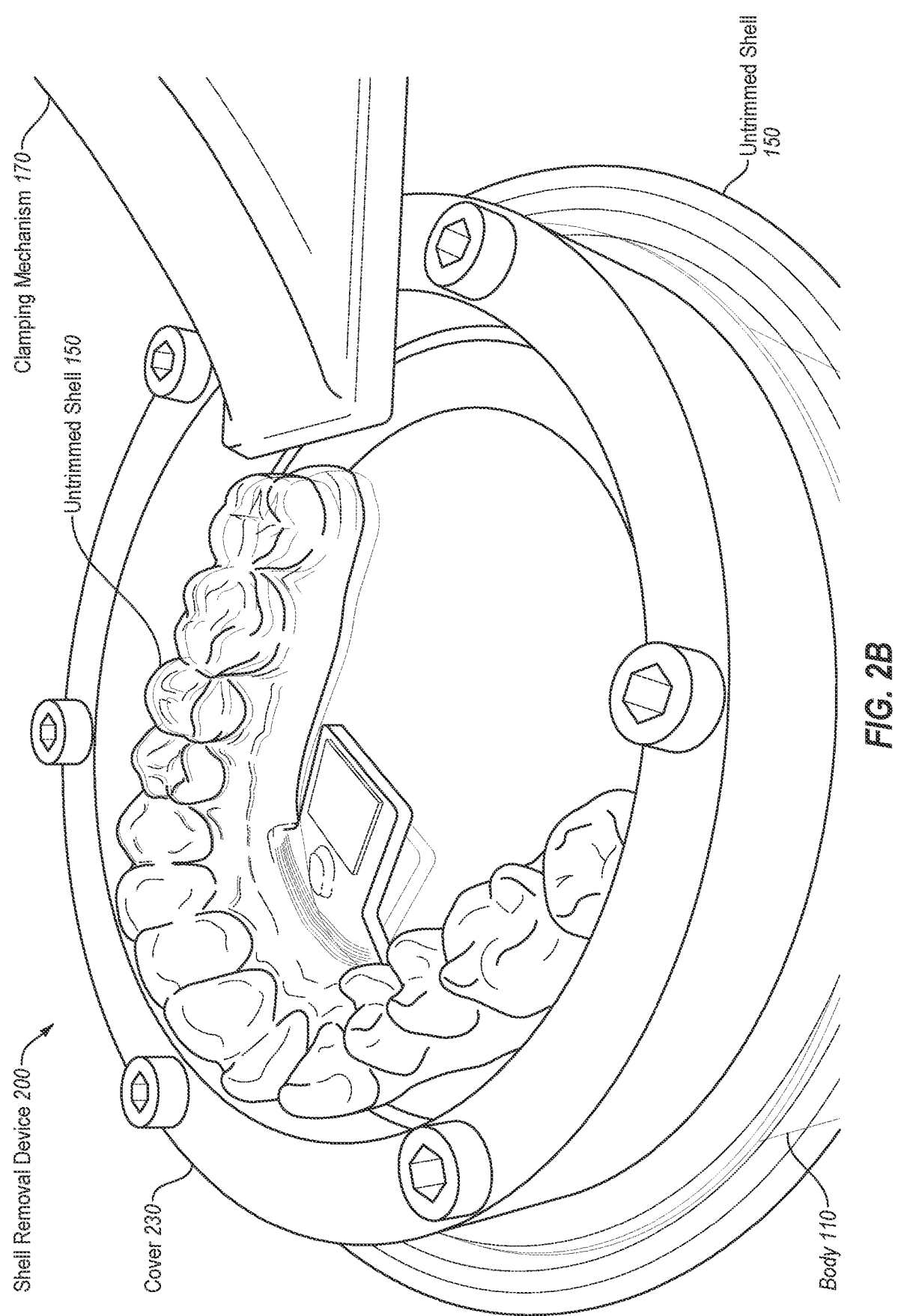
Figure 2C:
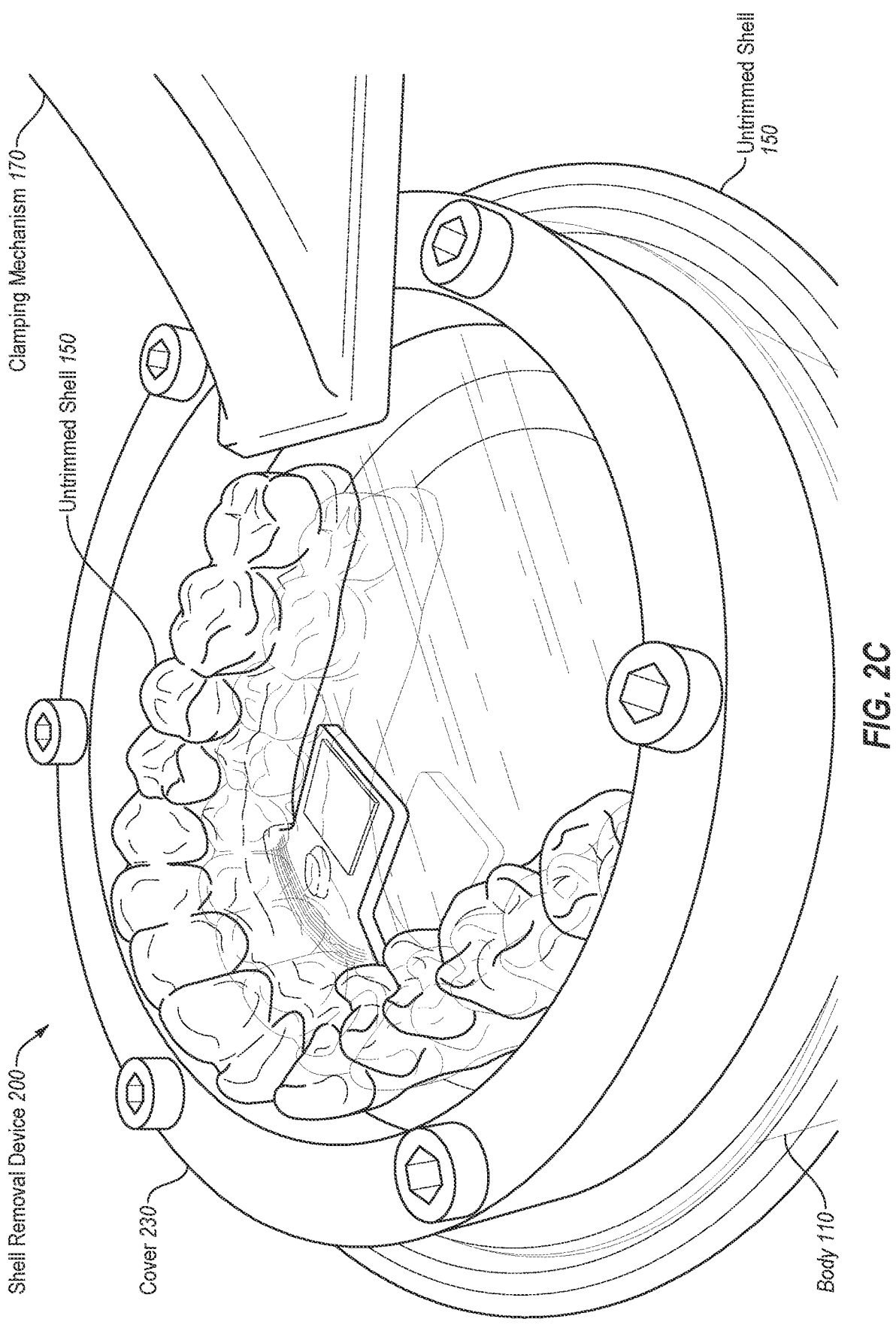

FIGS. 2A-C illustrate a shell removal device 200 causing an untrimmed shell 150 to release from a mold 140, according to certain embodiments. Shell removal device 200 may be an embodiment of shell removal device 100A-F of one or more of FIGS. 1A-F. In FIG. 2A, one or more portions of the untrimmed shell extend over the sidewalls 112 of the body 110 and the untrimmed shell 150 is secured between a lower surface of a cover 230 (which may correspond to any of cover 130A-E) and an upper surface of the body 110 via a clamping mechanism 170. In FIG. 2B, pressurized media enters the body to apply a positive pressure below the untrimmed shell 150, which begins to rise (e.g., inflate) the untrimmed shell 150 relative to the mold 140. Inflation of the untrimmed shell 150 causes the untrimmed shell 150 to have an interior surface that is larger than, and slightly separated from, the mold 140. In FIG. 2C, the platform 120 is lowered (e.g., to completely disengage the mold 140 from the untrimmed shell 150 while the untrimmed shell 150 is inflated. Since the untrimmed shell 150 is inflated, it may easily separate from the mold 140 without permanently deforming or damaging the untrimmed shell 150. Once the pressure differential is removed (after the mold is separated from the untrimmed shell 150), the pressurized media may be evacuated from the interior of the body, and the untrimmed shell 150 may return to its original size and shape.

As discussed above, the untrimmed shell 150 may be formed by thermoforming a plastic sheet over a mold. This plastic sheet may be larger than the mold, so that after the thermoforming a portion of the untrimmed shell 150 is still a plastic sheet that remains flat and extends past the mold. Such portions of the untrimmed shell 150 that are flat may be particularly susceptible to damage during application of a pressure differential. Accordingly, one or more pads may be used to press against the flat portion of the untrimmed shell 150 at one or more locations to protect the untrimmed shell 150 from deformation during the removal process.

Figure 3:
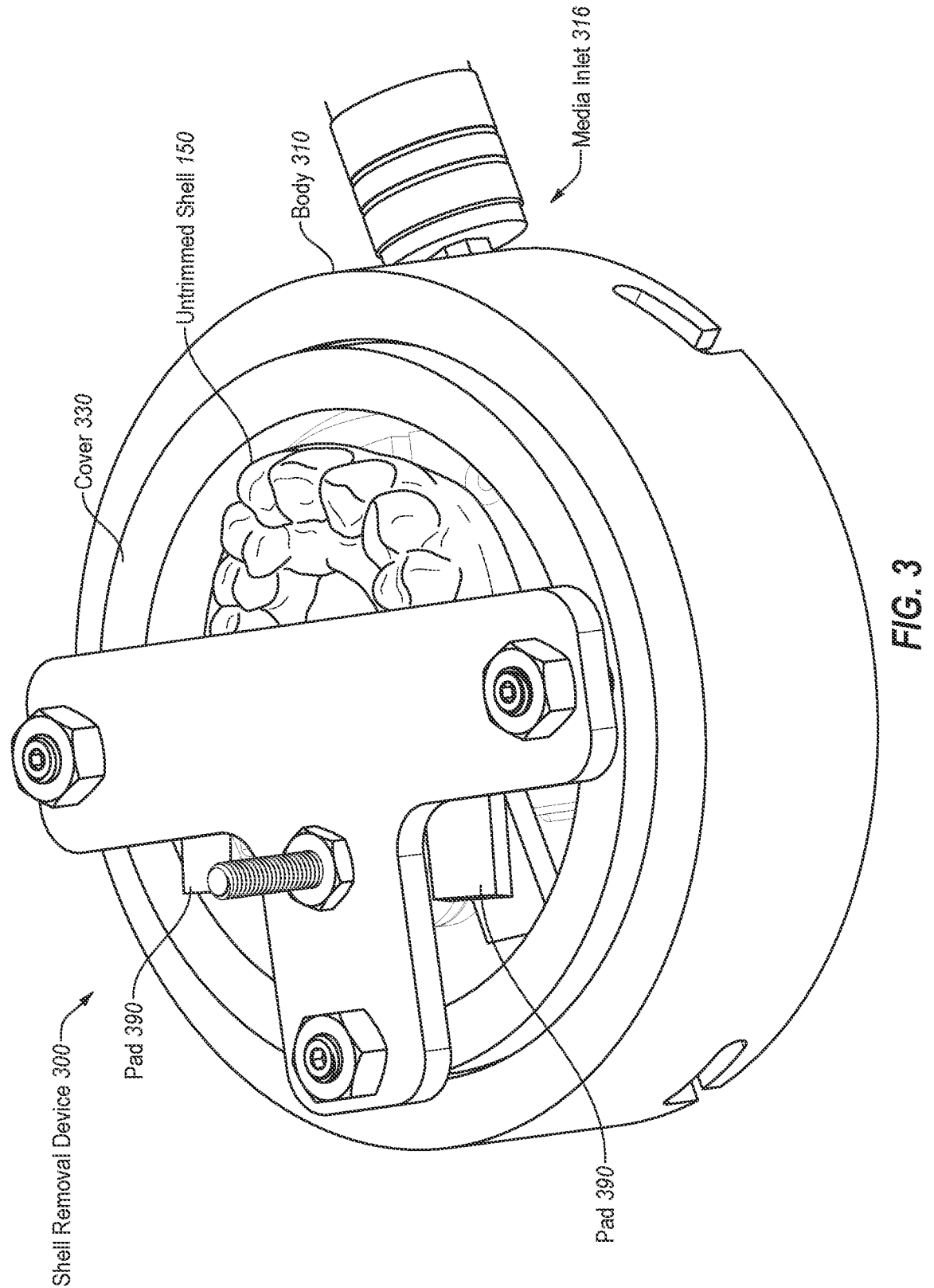
FIG. 3 illustrates a shell removal device pressing pads against the untrimmed shell, according to certain embodiments.

FIG. 3 illustrates a shell removal device 300 that includes one or more pads 390 (e.g., components made of compressible material, inflatable objects, etc.) that press against the untrimmed shell 150, according to certain embodiments. The shell removal device 300 may be an embodiment of shell removal device of one or more of FIGS. 1A-F or FIGS. 2A-C. The shell removal device 300 may include a cover 330 (e.g., an embodiment of a cover of one or more of FIGS. 1A-F or FIGS. 2A-C), a body 310 (e.g., an embodiment of a body of one or more of FIGS. 1A-F or FIGS. 2A-C), a media inlet 116 (e.g., an embodiment of a media inlet of one or more of FIGS. 1A-F or FIGS. 2A-C), one or more pads 390 (e.g., an embodiment of pads of one or more of FIGS. 1A-F or FIGS. 2A-C), etc. The cover 330 may include one or more portions. For example, a first portion of the cover 330 may be a ring having a first diameter that approximately matches a second diameter of the hollow cylindrical body of the body 310. A second portion may span at least a portion of the untrimmed shell 150. The second portion of the cover 330 may be mechanically attached to the first portion. One or more pads 390 may be attached to an inner side of the cover 330 (e.g., of the second portion of the cover 330 that spans at least a portion of the untrimmed shell 150). The pads 390 may be positioned to press against one or more flat regions of the untrimmed shell 150 that do not cover the mold 140 to prevent damage of the untrimmed shell 150 during application of the pressure differential (e.g., prevent bulging and permanent deformation of the regions of the untrimmed shell 150 that are not over the mold 140).

During application of the pressure differential, the portion of the untrimmed shell 150 that is disposed on the mold 140 (e.g., the portions that engage with the complex shapes of the mold) may exert more resistance against the pressurized media than the flat regions of the untrimmed shell 150 that do not engage with the mold 140. So that the high pressure of the pressurized media does not damage the untrimmed shell 150 (e.g., at the flat regions, etc.), the pads 390 may exert a force on one or more portions of the upper portion of the untrimmed shell 150 (e.g., at the flat regions). In some embodiments, the pads 390 may cover the flat regions and the portion of the untrimmed shell 150 above the mold (e.g., one pad that covers all of the untrimmed shell 150 within the cover 330). In some embodiments, the pads 390 may be used for molds with complex features.

Figure 4A:
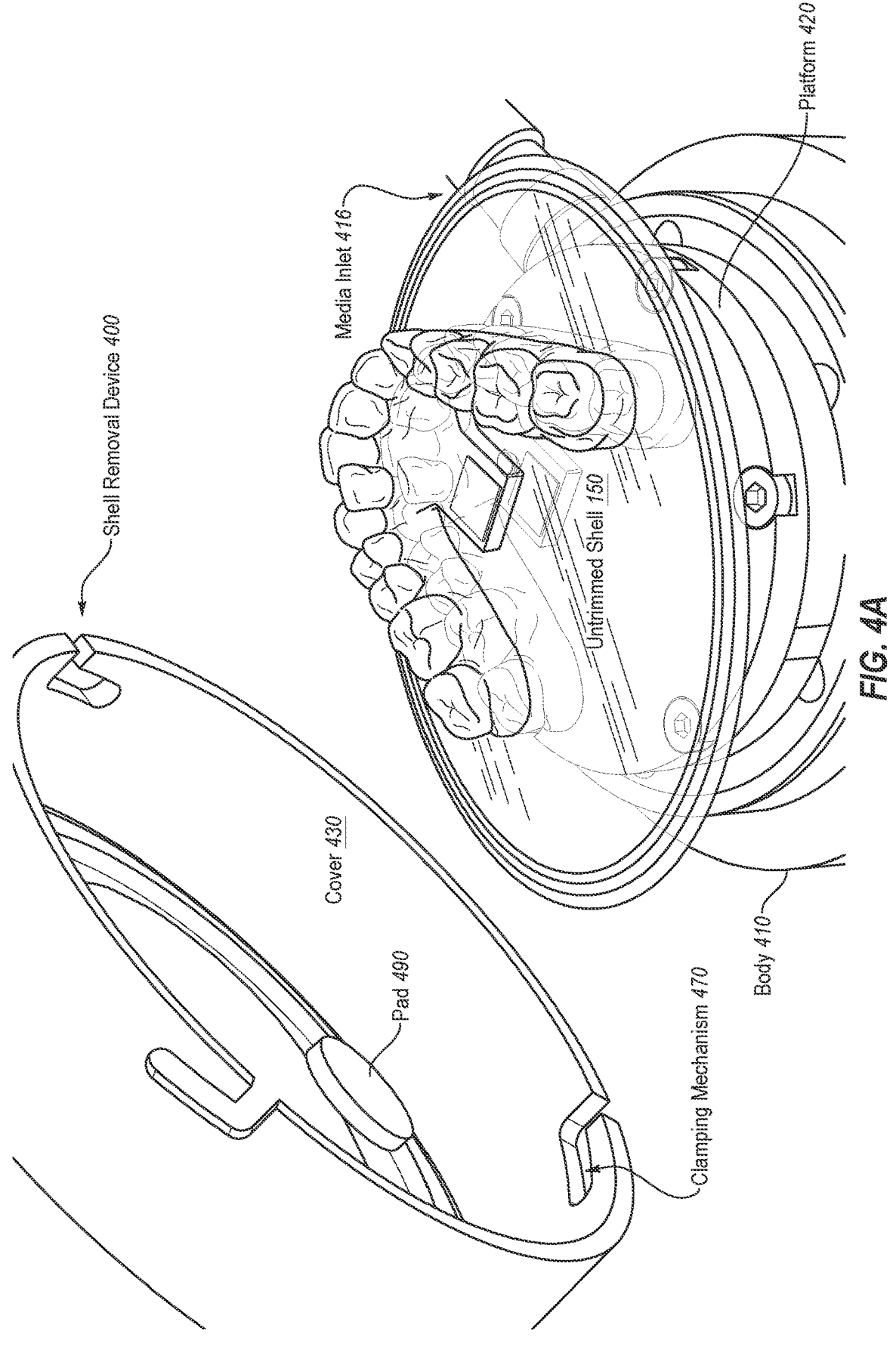
FIG. 4A illustrates a shell removal device and an untrimmed shell separated from the mold, according to certain embodiments.

FIG. 4A illustrates a shell removal device 400 and an untrimmed shell 150 separated from a mold 140, according to certain embodiments. The shell removal device 400 may be an embodiment of a shell removal device of one or more of FIGS. 1A-F, FIGS. 2A-C, or FIG. 3. The shell removal device 400 may include a cover 430 (e.g., an embodiment of a cover of one or more of FIGS. 1A-F, FIGS. 2A-C, or FIG. 3), a body 410 (e.g., an embodiment of a body of one or more of FIGS. 1A-F, FIGS. 2A-C, or FIG. 3), a media inlet 416 (e.g., an embodiment of a media inlet of one or more of FIGS. 1A-F, FIGS. 2A-C, or FIG. 3), one or more pads 490 (e.g., an embodiment of pads of one or more of FIGS. 1A-F, FIGS. 2A-C, or FIG. 3), a clamping mechanism 470 (e.g., an embodiment of clamping mechanism of one or more of FIGS. 1A-F, FIGS. 2A-C, or FIG. 3), a platform 420 (e.g., an embodiment of platform of one or more of FIGS. 1A-F, FIGS. 2A-C, or FIG. 3), etc. The cover 430 may include one or more pads 490 that correspond to a flat region of the untrimmed shell 150. The one or more pads 490 may press against one or more flat regions of the untrimmed shell 150 to prevent damage of the untrimmed shell during application of the pressure differential. The clamping mechanism 470 may include keyhole slots in the cover 430 and corresponding components (e.g., protrusions, screws, bolts, etc.) in the body 410. The mold 140 may be secured to the platform 420. The untrimmed shell 150 may be separated from the mold 140 responsive to a pressure differential applied via the shell removal device 400.

Figure 4B:
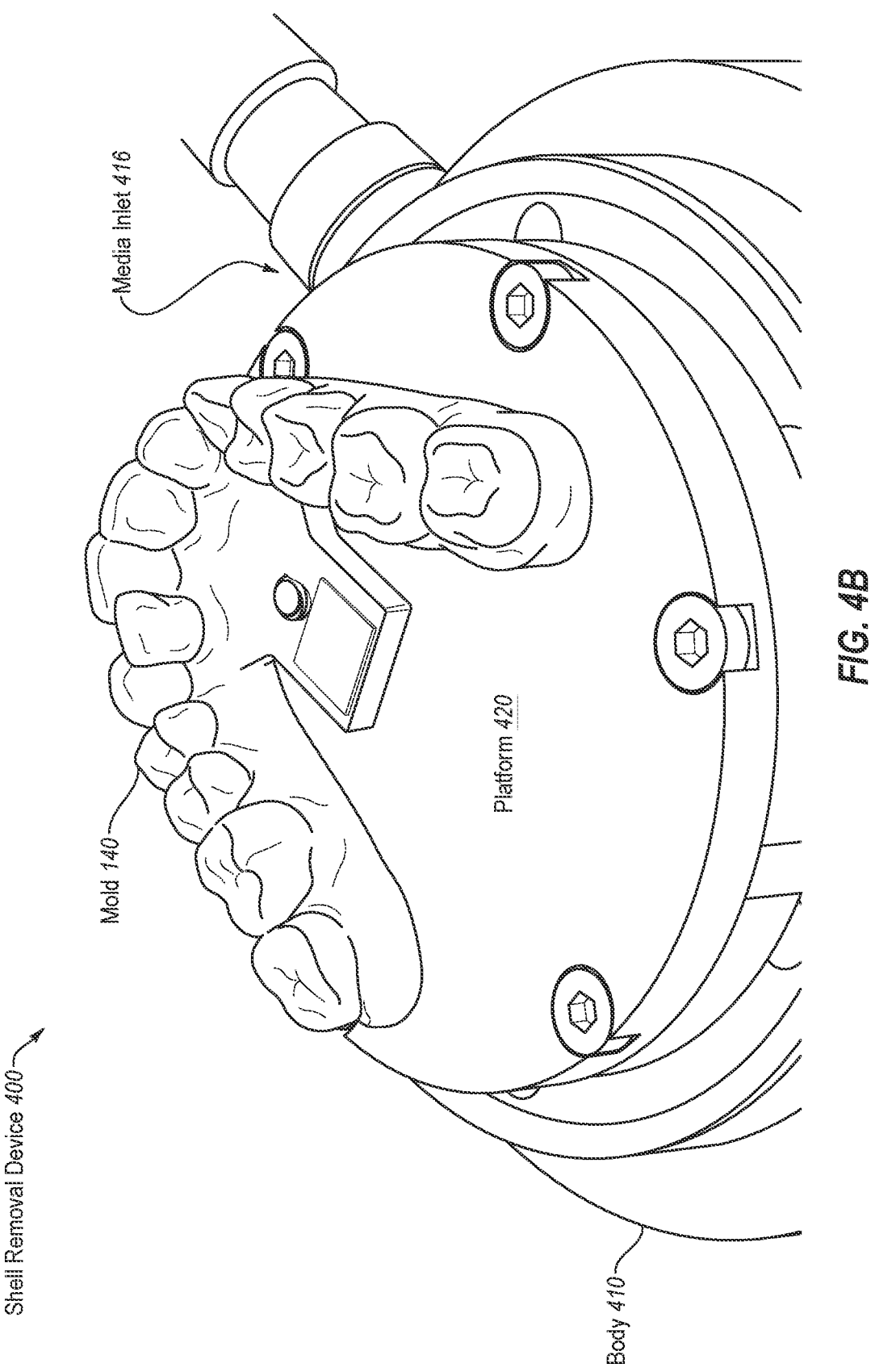
FIG. 4B illustrates a mold attached to a platform of a shell removal device, according to certain embodiments.

FIG. 4B illustrates a mold 140 attached to a platform 120 of shell removal device 400 (e.g., after removal of the untrimmed shell 150), according to certain embodiments. The mold 140 may include one or more components (e.g., protrusions, bolts, flat head screws tapped into the bottom of the mold 140, etc.) on a bottom surface of the mold 140 that engage with the platform 420. The platform 420 may include a keyhole slot and the components on the bottom surface of the mold 140 may engage with the keyhole slot to secure the mold 140 to the platform 420 in one embodiment. Other engagement features to engage the mold 140 to the platform 120 may also be used, such as a screw, a bolt, a clamp in the platform 420 that clamps onto one or more portions of the mold 140, and so on. The mold 140 may move vertically with the platform 120 that it is attached to responsive to the pressure differential. The mold 140 may be removed from the platform 420 by moving the mold 140 in a horizontal direction if a keyhole slot in the mold 140 and a screw that the screw is inserted into is used to secure the mold 140 to the platform 420.

Figure 5A:
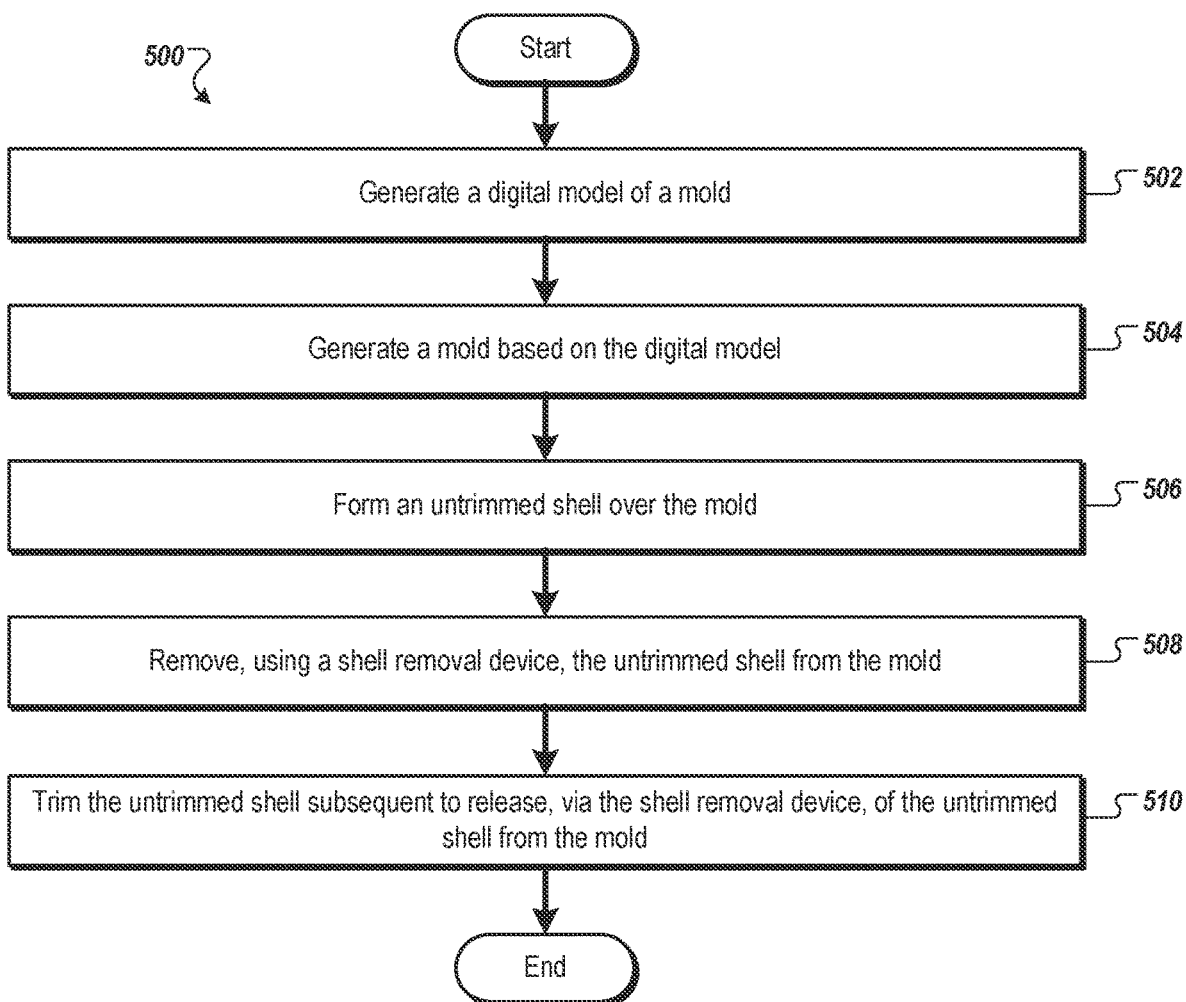
FIG. 5A illustrates a flow diagram for a method of forming an aligner, according to certain embodiments.

FIG. 5A illustrates a flow diagram for a method 500 for manufacturing an aligner, according to certain embodiments. In some embodiments, one or more operations of method 500 are performed by a processing logic of a computing device to automate one or more operations of forming an aligner. The processing logic may include hardware (e.g., circuitry, dedicated logic, programmable logic, microcode, etc.), software (e.g., instructions executed by a processing device), firmware, or a combination thereof. For example, one or more operations of method 500 may be performed by a processing device executing a program or module, such as aligner generator 650 of FIG. 6.

At block 502 of method 500, a digital model of a mold is generated. A shape of a dental arch for a patient at treatment stage may be determined based on a treatment plan to generate the digital model of the mold. In the example of orthodontics, the treatment plan may be generated based on an intraoral scan of a dental arch to be modeled. The intraoral scan of a patient's dental arch may be performed to generate a three dimensional (3D) virtual model of the patient's dental arch. For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold may be generated from an actual object to be modeled. The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arch at that treatment stage may be generated. The shape of each virtual 3D model will be different. The original virtual 3D model, the final virtual 3D model and each intermediate virtual 3D model is unique and customized to the patient.

The processing logic may determine an initial shape for a mold of the patient's dental arch at a treatment stage based on the digital model of the dental arch at that treatment stage. Processing logic may additionally determine one or more features to add to the mold that will cause the aligner formed over the mold to have the determined markings and/or elements.

The processing logic may determine a final shape for the mold and may generate a digital model of the mold. Alternatively, the digital model may have already been generated. In such an instance, processing logic updates the already generated digital model to include the determined features for the mold. The digital model may be represented in a file such as a computer aided drafting (CAD) file or a 3D printable file such as a stereolithography (STL) file. The digital model may include instructions that will control a fabrication system or device in order to produce the mold with specified geometries.

At block 504, a mold is generated based on the digital model. Each virtual 3D model of a patient's dental arch may be used to generate a unique customized mold of the dental arch at a particular stage of treatment. The shape of the mold may be at least in part based on the shape of the virtual 3D model for that treatment stage. The mold may correspond to a dental arch of a patient and the mold may include a sloping portion that commences below a gum line of the dental arch and extends away from the dental arch to a lower portion of the mold. A portion of the untrimmed shell that is disposed on the sloping portion of the mold is to be trimmed (e.g., at block 510 to form the trimmed shell). In some embodiments, at block 504, the mold is generated with the sloping portion commencing below the gum line to assist in the release of the untrimmed shell from the mold. The mold may be formed using a rapid prototyping equipment (e.g., 3D printers) to manufacture the mold using additive manufacturing techniques (e.g., stereolithography) or subtractive manufacturing techniques (e.g., milling). The digital model may be input into a rapid prototyping machine. The rapid prototyping machine then manufactures the mold using the digital model. One example of a rapid prototyping manufacturing machine is a 3D printer. 3D Printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In one embodiment, stereolithography (SLA), also known as optical fabrication solid imaging, is used to fabricate an SLA mold. In SLA, the mold is fabricated by successively printing thin layers of a photo-curable material (e.g., a polymeric resin) on top of one another. A platform rests in a bath of a liquid photopolymer or resin just below a surface of the bath. A light source (e.g., an ultraviolet laser) traces a pattern over the platform, curing the photopolymer where the light source is directed, to form a first layer of the mold.

The platform is lowered incrementally, and the light source traces a new pattern over the platform to form another layer of the mold at each increment. This process repeats until the mold is completely fabricated. Once all of the layers of the mold are formed, the mold may be cleaned and cured.

Materials such as a polyester, a co-polyester, a polycarbonate, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene tereph- thalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof, may be used to directly form the mold. The materials used for fabrication of the mold can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

Optionally, the rapid prototyping techniques described herein allow for fabrication of a mold including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials (e.g., resins, liquid, solids, or combinations thereof) from distinct material supply sources in order to fabricate an object from a plurality of different materials. Alternatively or in combination, a multi-material direct fabrication method can involve forming an object from multiple materials in a plurality of sequential manufacturing steps. For instance, a first portion of the object (e.g., a main portion of the mold) can be formed from a first material in accordance with any of the direct fabrication methods herein, then a second portion of the object (e.g., complex features added to the mold) can be formed from a second material in accordance with methods herein, and so on, until the entirety of the object has been formed. The relative arrangement of the first and second portions can be varied as desired. In one embodiment, multi-material direct fabrication is used to cause a first material to be used for the markings of the cut line on the mold, and to cause one or more additional materials to be used for the remainder of the mold.

Aligners may be formed from each mold to provide forces to move the patient's teeth. The shape of each aligner is unique and customized for a particular patient and a particular treatment stage. In an example, the aligners can be pressure formed or thermoformed over the molds. Each mold may be used to fabricate an aligner that will apply forces to the patient's teeth at a particular stage of the orthodontic treatment. The aligners each have teeth-receiving cavities that receive and resiliently reposition the teeth in accordance with a particular treatment stage. At block 506, an untrimmed shell is formed over the mold. In one embodiment, a sheet of material is pressure formed or thermoformed over the mold. The sheet may be, for example, a sheet of plastic (e.g., an elastic thermoplastic, a sheet of polymeric material, etc.). To thermoform the shell over the mold, the sheet of material may be heated to a temperature at which the sheet becomes pliable. Pressure may concurrently be applied to the sheet to form the now pliable sheet around the mold with the features that will imprint the markings and/or elements in the aligner. Once the sheet cools, it will have a shape that conforms to the mold. In one embodiment, a release agent (e.g., a non-stick material) is applied to the mold before forming the shell. This may facilitate later removal of the mold from the shell. Responsive to forming the untrimmed shell over the mold, manual removal of the shell from the mold may result in damaging the shell, quality issues (e.g., deformation, becoming bent, etc.). Complexity of the mold (e.g., overcrowding, steep overhangs, multiple attachments, etc.) may make manual removal of the shell from the mold time consuming and damage prone.

At block 508, the untrimmed shell is removed from the mold using a shell removal device as described herein (e.g., shell removal device of one or more of FIG. 1A-F, 2A-C, 3, or 4A-B). In some embodiments, the untrimmed shell may be removed from the mold using method 550 of FIG. 5B.

At block 510, the untrimmed shell is trimmed to generate an aligner. In some embodiments, the portion of the untrimmed shell that is disposed on a portion of the mold that slopes outward below the gum line is removed during the trimming of the untrimmed shell to generate the aligner. After the untrimmed shell is removed from the mold for a treatment stage, the untrimmed shell is subsequently trimmed along one or more cut lines (also referred to as a trim line). The cut line may be a gingival cut line that represents an interface between an aligner and a patient's gingiva. In one embodiment, the aligner is manually cut by a technician using scissors, a bur, a cutting wheel, a scalpel, or any other cutting implement. In another embodiment, the aligner is cut by a computer controlled trimming machine such as a CNC machine or a laser trimming machine. The computer controlled trimming machine may control an angle and position of a cutting tool of the trimming machine to trim the untrimmed shell.

FIG. 5B illustrates a flow diagram for a method 550 of removing an untrimmed shell from a mold, according to certain embodiments. One or more operations of method 550 are performed by a shell removal device. In some embodiments, one or more operations of method 550 are performed by a processing logic of a computing device to automate operations of the shell removal device. The processing logic may include hardware (e.g., circuitry, dedicated logic, programmable logic, microcode, etc.), software (e.g., instructions executed by a processing device), firmware, or a combination thereof. For example, one or more operations of method 550 may be performed by a processing device executing a program or module to control the shell removal device, such as aligner generator 650 of FIG. 6.

At block 552 of method 550, a mold is secured to a platform within an interior of a body of a shell removal device, where an untrimmed shell has been formed over the mold. In some embodiments, a first component (e.g., protrusion, screw, bolt, etc.) on the bottom of the mold engages with a second component (e.g., a keyhole slot, etc.) on the upper surface of the platform (e.g., see FIG. 4B). The first component and the second component may engage and disengage in a horizontal direction. Pressure in the vertical direction (e.g., a pressure differential) or movement in the vertical direction (e.g., moving the platform away from the shell) may not disengage the mold from the platform.

At block 554, the untrimmed shell is secured between a lower surface of a cover of the shell removal device and an upper surface of one or more sidewalls of the body to provide a seal. In some embodiments, the seal is provided by an O-ring between the lower surface of the untrimmed shell and an upper surface of the body. In some embodiments, the seal is provided by an O-ring between the upper surface of the untrimmed shell and a lower surface of the cover. In some embodiments, a seal is provided both at both the upper and lower surfaces of the untrimmed shell (e.g., both between the lower surface of the untrimmed shell and an upper surface of the body and between the upper surface of the untrimmed shell and a lower surface of the cover).

Optionally, at block 556, pressurized media is pumped into the interior of the body to cause a pressure differential between upper and lower surfaces of the untrimmed shell. The pressurized media may be pumped via a media inlet in the body.

Optionally, at block 558, media is pumped out of an area defined by the cover and the upper surface of the untrimmed shell to cause a pressure differential between the upper and lower surfaces of the untrimmed shell. The media may be pumped out via a media outlet in the cover. In some embodiments, media is pumped out via the media outlet and in via the media inlet simultaneously to cause the pressure differential. In some embodiments, media is pumped in via the media inlet or out via the media outlet (e.g., one or another).

Optionally, at block 560, one or more pads attached to an inner side of the cover are pressed against one or more flat regions of the untrimmed shell that do not cover the mold to prevent deformation of the untrimmed shell. In some embodiments, one or more pads are pressed against regions of the untrimmed shell that do cover the mold and regions of the untrimmed shell that do not cover the mold. One or more features of the untrimmed shell (e.g., complex features, hard-to-remove portions) may be removed from the mold at a higher pressure differential and one or more regions of the untrimmed shell (e.g., regions not above the mold, regions not above the complex features) may disengage at a lower differential pressure. The one or more pads may be pressed against the regions of the untrimmed shell that disengage at lower differential pressures (e.g., to not damage those regions while a higher pressure differential is applied to disengage complex features).

At block 562, the untrimmed shell is caused to expand and release from the mold based on the pressure differential. The pressure differential may be applied via one or more of the media inlet or the media outlet by one or more pumps. The media may be a gas (e.g., air, inert gas, a mixture of gases, etc.) or liquid (e.g., water, etc.). The media may be an unreactive gas or liquid. In some embodiments, the pressure differential may range from 5 pounds per square inch (psi) to 30 psi depending on the geometry of the mold (e.g., the complexity of the features in the mold). The differential pressure may be high enough to begin to or fully disengage the untrimmed shell 150 from the mold 140, but not so high that it permanently changes the shape of the untrimmed shell 150 (e.g., the untrimmed shell 150 may be temporarily deformed, but not permanently deformed).

Optionally, at block 564, a sensor of the shell removal device detects that the untrimmed shell has begun to separate from the mold to trigger a drive mechanism of the shell removal device. The sensor may be an optical sensor, a pressure sensor, a contact sensor, etc. In the case of an optical sensor, the sensor may receive an optical reading of a threshold amount of contrast (e.g., the untrimmed shell separated a threshold distance from the mold). The drive mechanism may be triggered once the mold and untrimmed shell have separated at least a threshold amount (e.g., 0.2 millimeters (mm)) in one embodiment. The drive mechanism may be triggered after the untrimmed shell has begun to separate from the mold to not damage the untrimmed shell or mold (e.g., moving the mold prior to separation beginning may be too high of a force on complex features of the untrimmed shell resulting in damaging the untrimmed shell). In one embodiment, the drive mechanism begins moving the platform away from the mold based on a timer. For example, a sample timer value may be between 5 and 60 seconds. In another example, a sample time value may be between 5 and 25 seconds. The timer may start when the pressure differential reaches a target value. When the timer counts down to 0, then the drive mechanism may be triggered. In one embodiment, the drive mechanism begins moving when the pressure differential reaches a target value.

Optionally, at block 566, a drive mechanism of the shell removal device moves the platform away from the untrimmed shell during the pressure differential to cause the mold to separate from the untrimmed shell. Alternatively, no drive mechanism may be used, and the pressure differential itself may be used to completely separate the mold from the untrimmed shell. For example, the platform may have a weight that causes it to drop away from the untrimmed shell when the untrimmed shell expands from the pressure differential.

The platform and mold may move to a lowered position so that once the pressure differential is removed, the untrimmed shell does not re-engage with the mold. In some embodiments, the pressure differential may begin to separate the untrimmed shell from the mold and the moving of the platform away from the untrimmed shell may complete the removal of the untrimmed shell from the mold. In some embodiments, the pressure differential completes the removal of the untrimmed shell from the mold and the moving of the platform away from the untrimmed shell may prevent the untrimmed shell from re-engaging with the mold. The drive mechanism may move the platform a vertical displacement of 1 mm to 13 mm depending on the geometry of the mold in some embodiments. The drive mechanism may move the platform at a rate of displacement of 1 mm per second (mm/s) to 25 mm/s depending on the geometry of the mold in some embodiments.

In some embodiments, the shell removal device moves the platform away from the untrimmed shell to remove the untrimmed shell from the mold without applying a pressure differential (e.g., without applying positive pressure below the untrimmed shell or negative pressure below the untrimmed shell). In some embodiments, moving of the platform without applying a pressure differential may be used for untrimmed shells without complex features and the applying of the pressure differential (e.g., combined with moving the platform) may be used for untrimmed shells with complex features. In some embodiments, applying of the pressure differential may be used for all untrimmed shells.

In some embodiments, data may be gathered including amount of differential pressure applied and for how long when the platform was moved, the distance and rate that the platform was moved, the complexity of the mold (e.g., number or type of complex features), and whether the untrimmed shell was damaged or had other quality issues responsive to being removed from the mold. The data may be analyzed to determine an amount of pressure differential to apply and for how long before moving the platform and a distance and rate of moving the platform for different types of molds or untrimmed shells. Upon determining the type of mold or untrimmed shell (e.g., by aligner generator 650 of FIG. 6), the shell removing device may determine an appropriate pressure differential, distance of displacement, rate of displacement, etc. The shell removing device may then remove the untrimmed shell from the mold at the corresponding amount and length of time of application of pressure differential, distance and rate of displacement of platform, etc.

Figure 6:
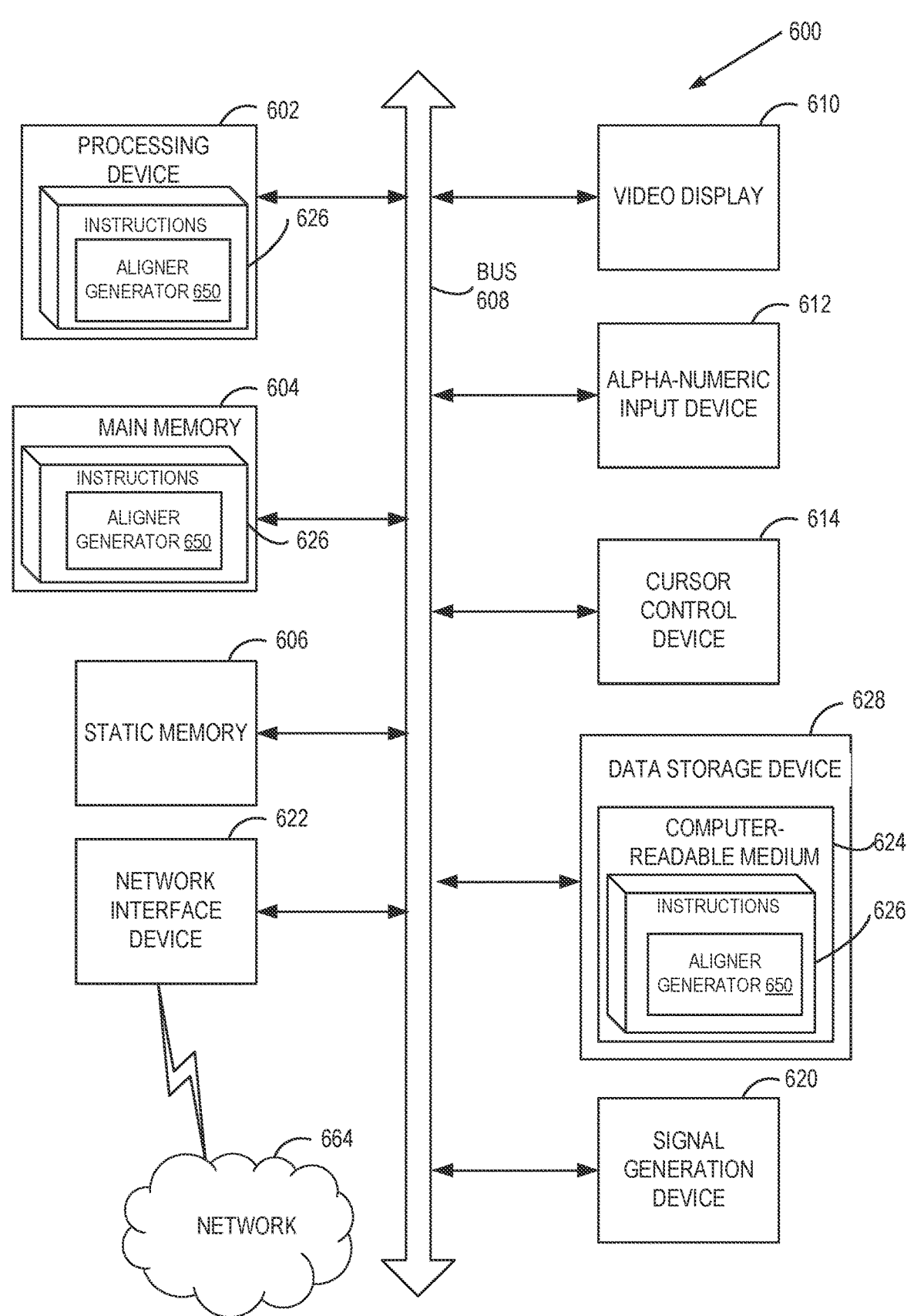
FIG. 6 illustrates a block diagram of an example computing device, according to certain embodiments.

FIG. 6 illustrates a diagrammatic representation of a machine in the example form of a computing device 600 within which a set of instructions, for causing the machine to perform any one or more of the methodologies discussed with reference to the methods of FIGS. 5A-B. In alternative embodiments, the machine may be connected (e.g., networked) to other machines in a Local Area Network (LAN), an intranet, an extranet, or the Internet. For example, the machine may be networked to a rapid prototyping apparatus such as a 3D printer or SLA apparatus. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 628), which communicate with each other via a bus 608.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 626) for performing operations and steps discussed herein.

The computing device 600 may further include a network interface device 622 for communicating with a network 664. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 628 may include a machine-readable storage medium (or more specifically a non-transitory computer-readable storage medium) 624 on which is stored one or more sets of instructions 626 embodying any one or more of the methodologies or functions described herein. A non-transitory storage medium refers to a storage medium other than a carrier wave. The instructions 626 may also reside, completely or at least partially, within the main memory 604 and/or within the processing device 602 during execution thereof by the computing device 600, the main memory 604 and the processing device 602 also constituting computer-readable storage media.

The computer-readable storage medium 624 may also be used to store one or more instructions for aligner production and/or an aligner generator 650, which may perform one or more of the operations of methods 500 and 550 described with reference to FIGS. 5A-B. The computer-readable storage medium 624 may also store a software library containing methods that call an aligner generator 650. While the computer-readable storage medium 624 is shown in an example embodiment to be a single medium, the term "non-transitory computer-readable storage medium" should be taken to include a single medium or multiple media (e.g., a centralized or distributed database, and/or associated caches and servers) that store the one or more sets of instructions. The term "non-transitory computer-readable storage medium" shall also be taken to include any medium that is capable of storing or encoding a set of instructions for execution by the machine and that cause the machine to perform any one or more of the methodologies of the present disclosure. The term "non-transitory computer-readable storage medium" shall accordingly be taken to include, but not be limited to, solid-state memories, and optical and magnetic media.

Figure 7A:
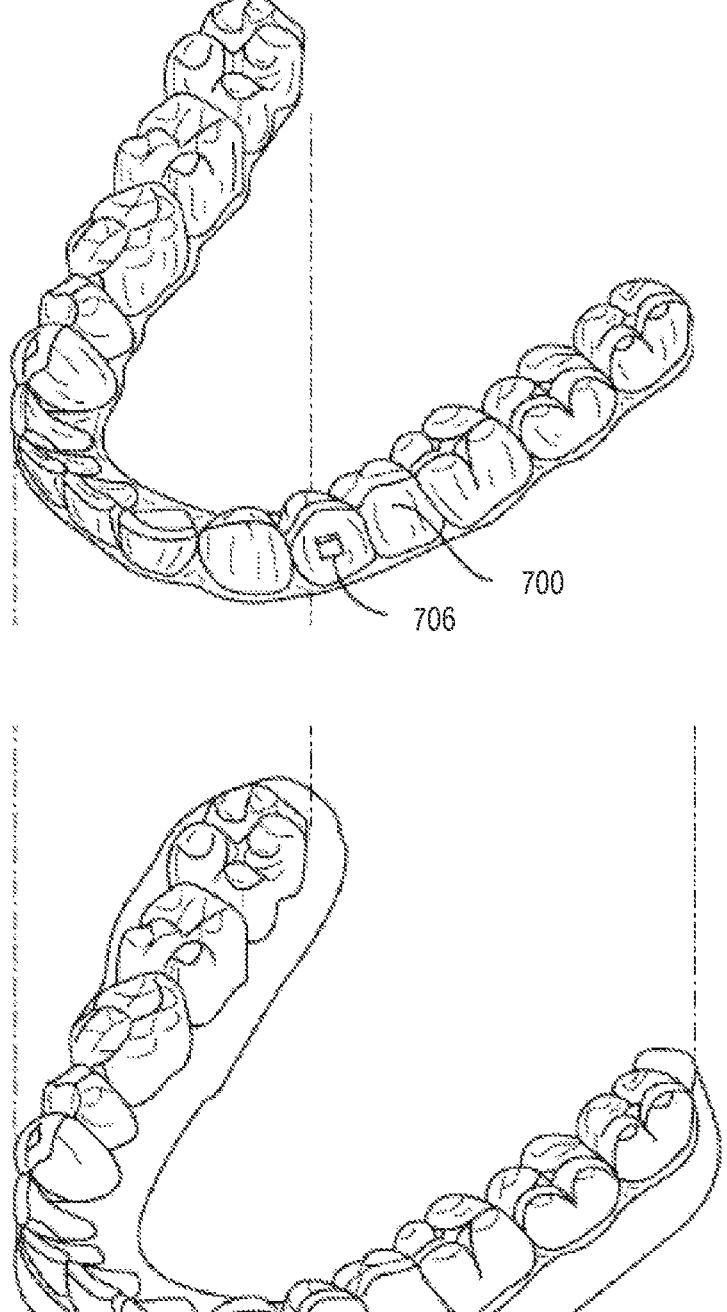
FIG. 7A illustrates a tooth repositioning appliance, according to certain embodiments.

FIG. 7A illustrates an exemplary tooth repositioning appliance or aligner 700 that can be worn by a patient in order to achieve an incremental repositioning of individual teeth 702 in the jaw. The aligner 700 may be trimmed after automated removal from a mold (e.g., the aligner 700 may be an untrimmed shell 150 that has been trimmed after automated removal from mold 140 using a shell removal device, as described herein). The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. A "polymeric material," as used herein, may include any material formed from a polymer. A "polymer," as used herein, may refer to a molecule composed of repeating structural units connected by covalent chemical bonds often characterized by a substantial number of repeating units (e.g., equal to or greater than 3 repeating units, optionally, in some embodiments equal to or greater than 10 repeating units, in some embodiments greater or equal to 30 repeating units) and a high molecular weight (e.g. greater than or equal to 10,000 Da, in some embodiments greater than or equal to 50,000 Da or greater than or equal to 100,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Useful polymers include organic polymers or inorganic polymers that may be in amorphous, semi-amorphous, crystalline or semi-crystalline states. Polymers may include polyolefins, polyesters, polyacrylates, polymethacrylates, polystyrenes, Polypropylenes, polyethylenes, Polyethylene terephthalates, poly lactic acid, polyurethanes, epoxide polymers, polyethers, poly (vinyl chlorides), polysiloxanes, polycarbonates, polyamides, poly acrylonitriles, polybutadienes, poly(cycloolefins), and copolymers. The systems and/or methods provided herein are compatible with a range of plastics and/or polymers. Accordingly, this list is not all inclusive, but rather is exemplary. The plastics can be thermosets or thermoplastics. The plastic may be a thermoplastic.

Examples of materials applicable to the embodiments disclosed herein include, but are not limited to, those materials described in the following Provisional patent applications filed by Align Technology: "MULTI-MATERIAL ALIGNERS," U.S. Prov. App. Ser. No. 62/189,259, filed Jul. 7, 2015; "DIRECT FABRICATION OF ALIGNERS WITH INTERPROXIMAL FORCE COUPLING", U.S. Prov. App. Ser. No. 62/189,263, filed Jul. 7, 2015; "DIRECT FABRICATION OF ORTHODONTIC APPLIANCES WITH VARIABLE PROPERTIES," U.S. Prov. App. Ser. No. 62/189,291, filed Jul. 7, 2015; "DIRECT FABRICATION OF ALIGNERS FOR ARCH EXPANSION", U.S. Prov. App. Ser. No. 62/189,271, filed Jul. 7, 2015; "DIRECT FABRICATION OF ATTACHMENT TEMPLATES WITH ADHESIVE," U.S. Prov. App. Ser. No. 62/189,282, filed Jul. 7, 2015; "DIRECT FABRICATION CROSS-LINKING FOR PALATE EXPANSION AND OTHER APPLICATIONS", U.S. Prov. App. Ser. No. 62/189,301, filed Jul. 7, 2015; "SYSTEMS, APPARATUSES AND METHODS FOR DENTAL APPLIANCES WITH INTEGRALLY FORMED FEATURES", U.S. Prov. App. Ser. No. 62/189, 312, filed Jul. 7, 2015; "DIRECT FABRICATION OF POWER ARMS", U.S. Prov. App. Ser. No. 62/189,317, filed Jul. 7, 2015; "SYSTEMS, APPARATUSES AND METHODS FOR DRUG DELIVERY FROM DENTAL APPLIANCES WITH INTEGRALLY FORMED RESERVOIRS", U.S. Prov. App. Ser. No. 62/189,303, filed Jul. 7, 2015; "DENTAL APPLIANCE HAVING ORNAMENTAL DESIGN", U.S. Prov. App. Ser. No. 62/189,318, filed Jul. 7, 2015; "DENTAL MATERIALS USING THERMOSET POLYMERS," U.S. Prov. App. Ser. No. 62/189,380, filed Jul. 7, 2015; "CURABLE COMPOSITION FOR USE IN A HIGH TEMPERATURE LITHOGRAPHY-BASED PHOTOPOLYMERIZATION PROCESS AND METHOD OF PRODUCING CROSSLINKED POLYMERS THERE-FROM," U.S. Prov. App. Ser. No. 62/667,354, filed May 4, 2018; "POLYMERIZABLE MONOMERS AND METHOD OF POLYMERIZING THE SAME," U.S. Prov. App. Ser. No. 62/667,364, filed May 4, 2018; and any conversion applications thereof (including publications and issued patents), including any divisional, continuation, or continuation-in-part thereof.

Although polymeric aligners are discussed herein, the techniques disclosed may also be applied to aligners having different materials. Some embodiments are discussed herein with reference to orthodontic aligners (also referred to simply as aligners). However, embodiments also extend to other types of shells formed over molds, such as orthodontic retainers, orthodontic splints, sleep appliances for mouth insertion (e.g., for minimizing snoring, sleep apnea, etc.) and/or shells for non-dental applications. Accordingly, it should be understood that embodiments herein that refer to aligners also apply to other types of shells. For example, the principles, features and methods discussed may be applied to any application or process in which it is useful to perform automated removal from a mold of any suitable type of shells that are form fitting devices such as eye glass frames, contact or glass lenses, hearing aids or plugs, artificial knee caps, prosthetic limbs and devices, orthopedic inserts, as well as protective equipment such as knee guards, athletic cups, or elbow, chin, and shin guards and other like athletic/protective devices.

The aligner 700 can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 704 on teeth 702 with corresponding receptacles or apertures 706 in the appliance 700 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309, 215 and 6,830,450.

Figure 7B:
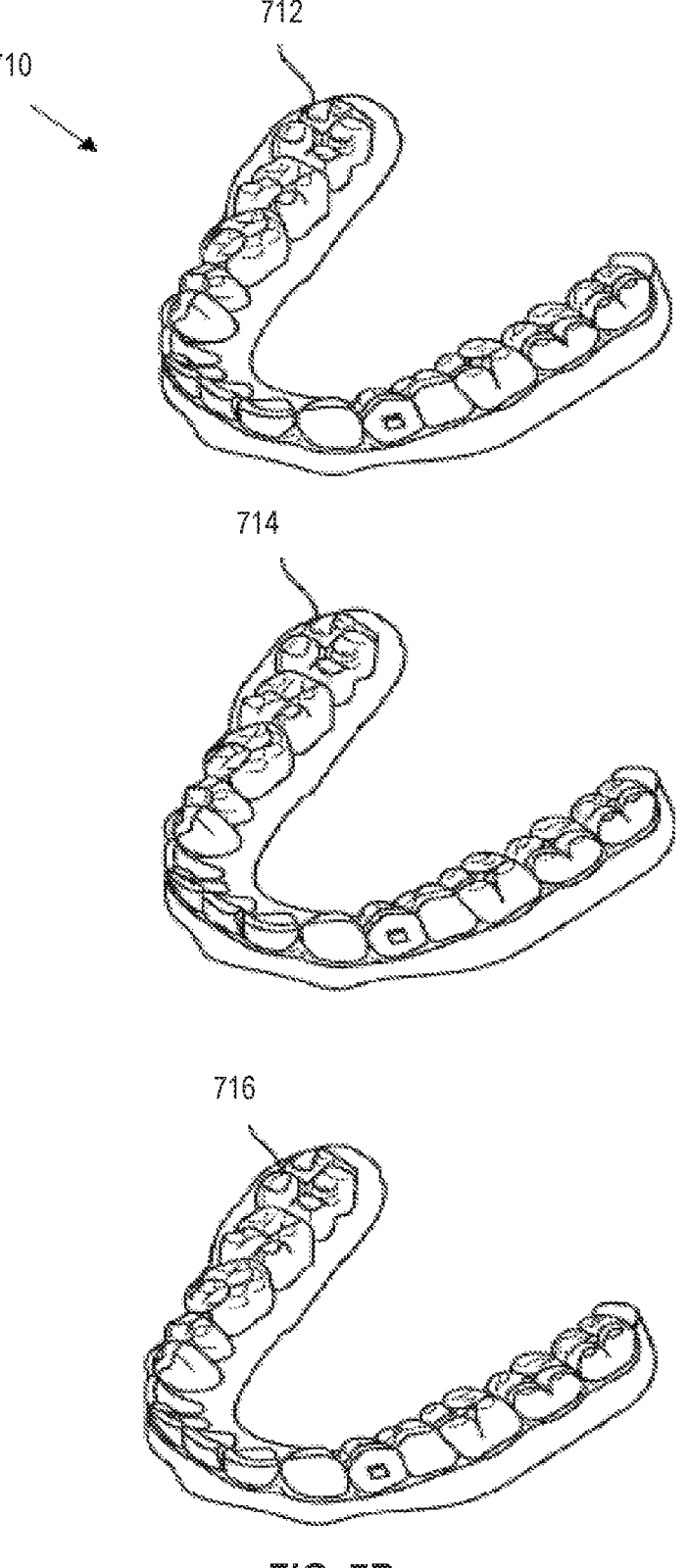
FIG. 7B illustrates a tooth repositioning system, according to certain embodiments.

FIG. 7B illustrates a tooth repositioning system 710 including a plurality of appliances 712, 714, 716. The appliances 712, 714, 716 may be trimmed after automated removal from a mold (e.g., the appliances 712, 714, 716 may be trimmed shells 150 that have been trimmed after automated removal from mold 140 using a shell removal device, as described herein). Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 710 can include a first appliance 712 corresponding to an initial tooth arrangement, one or more intermediate appliances 714 corresponding to one or more intermediate arrangements, and a final appliance 716 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

In some embodiments, the appliances 712, 714, 716 (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

In an example of indirect fabrication, a mold of a patient's dental arch may be fabricated from a digital model of the dental arch, and a shell may be formed over the mold (e.g., by thermoforming a polymeric sheet over the mold of the dental arch and then trimming the thermoformed polymeric sheet). The fabrication of the mold may be performed by a rapid prototyping machine (e.g., a stereolithography (SLA) 3D printer). The rapid prototyping machine may receive digital models of molds of dental arches and/or digital models of the appliances 712, 714, 716 after the digital models of the appliances 712, 714, 716 have been processed by processing logic of a computing device, such as the computing device in FIG. 6. The processing logic may include hardware (e.g., circuitry, dedicated logic, programmable logic, microcode, etc.), software (e.g., instructions executed by a processing device), firmware, or a combination thereof. For example, one or more operations may be performed by a processing device executing an aligner generator 650.

To manufacture the molds, a shape of a dental arch for a patient at a treatment stage is determined based on a treatment plan. In the example of orthodontics, the treatment plan may be generated based on an intraoral scan of a dental arch to be modeled. The intraoral scan of the patient's dental arch may be performed to generate a three dimensional (3D) virtual model of the patient's dental arch (mold). For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold may be generated from an actual object to be modeled (e.g., a dental impression or the like). The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arch at that treatment stage may be generated. The shape of each virtual 3D model will be different. The original virtual 3D model, the final virtual 3D model and each intermediate virtual 3D model is unique and customized to the patient.

Accordingly, multiple different virtual 3D models (digital designs) of a dental arch may be generated for a single patient. A first virtual 3D model may be a unique model of a patient's dental arch and/or teeth as they presently exist, and a final virtual 3D model may be a model of the patient's dental arch and/or teeth after correction of one or more teeth and/or a jaw. Multiple intermediate virtual 3D models may be modeled, each of which may be incrementally different from previous virtual 3D models.

Each virtual 3D model of a patient's dental arch may be used to generate a unique customized physical mold of the dental arch at a particular stage of treatment. The shape of the mold may be at least in part based on the shape of the virtual 3D model for that treatment stage. The virtual 3D model may be represented in a file such as a computer aided drafting (CAD) file or a 3D printable file such as a stereolithography (STL) file. The virtual 3D model for the mold may be sent to a third party (e.g., clinician office, laboratory, manufacturing facility or other entity). The virtual 3D model may include instructions that will control a fabrication system or device in order to produce the mold with specified geometries.

A clinician office, laboratory, manufacturing facility or other entity may receive the virtual 3D model of the mold, the digital model having been created as set forth above. The entity may input the digital model into a rapid prototyping machine. The rapid prototyping machine then manufactures the mold using the digital model. One example of a rapid prototyping manufacturing machine is a 3D printer. 3D printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In some instances, stereolithography (SLA), also known as optical fabrication solid imaging, is used to fabricate an SLA mold. In SLA, the mold is fabricated by successively printing thin layers of a photo-curable material (e.g., a polymeric resin) on top of one another. A platform rests in a bath of a liquid photopolymer or resin just below a surface of the bath. A light source (e.g., an ultraviolet laser) traces a pattern over the platform, curing the photopolymer where the light source is directed, to form a first layer of the mold. The platform is lowered incrementally, and the light source traces a new pattern over the platform to form another layer of the mold at each increment. This process repeats until the mold is completely fabricated. Once all of the layers of the mold are formed, the mold may be cleaned and cured.

Materials such as a polyester, a co-polyester, a polycarbonate, a polycarbonate, a thermopolymeric polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermopolymeric elastomer (TPE), a thermopolymeric vulcanizate (TPV) elastomer, a polyurethane elastomer, a block copolymer elastomer, a polyolefin blend elastomer, a thermopolymeric co-polyester elastomer, a thermopolymeric polyamide elastomer, or combinations thereof, may be used to directly form the mold. The materials used for fabrication of the mold can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

Appliances may be formed from each mold and when applied to the teeth of the patient, may provide forces to move the patient's teeth as dictated by the treatment plan. The shape of each appliance is unique and customized for a particular patient and a particular treatment stage. In an example, the appliances 712, 714, 716 can be pressure formed or thermoformed over the molds. Each mold may be used to fabricate an appliance that will apply forces to the patient's teeth at a particular stage of the orthodontic treatment. The appliances 712, 714, 716 each have teeth-receiving cavities that receive and resiliently reposition the teeth in accordance with a particular treatment stage.

In one embodiment, a sheet of material is pressure formed or thermoformed over the mold. The sheet may be, for example, a sheet of polymeric (e.g., an elastic thermopolymeric, a sheet of polymeric material, etc.). To thermoform the shell over the mold, the sheet of material may be heated to a temperature at which the sheet becomes pliable. Pressure may concurrently be applied to the sheet to form the now pliable sheet around the mold. Once the sheet cools, it will have a shape that conforms to the mold. In one embodiment, a release agent (e.g., a non-stick material) is applied to the mold before forming the shell. This may facilitate later removal of the mold from the shell. Forces may be applied to lift the appliance from the mold. In some instances, a breakage, warpage, or deformation may result from the removal forces. Accordingly, embodiments disclosed herein may determine where the probable point or points of damage may occur in a digital design of the appliance prior to manufacturing and may perform a corrective action.

Additional information may be added to the appliance. The additional information may be any information that pertains to the appliance. Examples of such additional information includes a part number identifier, patient name, a patient identifier, a case number, a sequence identifier (e.g., indicating which appliance a particular liner is in a treatment sequence), a date of manufacture, a clinician name, a logo and so forth. For example, after determining there is a probable point of damage in a digital design of an appliance, an indicator may be inserted into the digital design of the appliance. The indicator may represent a recommended place to begin removing the polymeric appliance to prevent the point of damage from manifesting during removal in some embodiments.

In some embodiments, a library of removal methods/patterns may be established and this library may be referenced when simulating the removal of the aligner in the numerical simulation. Different patients or production technicians may tend to remove aligners differently, and there might be a few typical patterns. For example: 1) some patients lift from the lingual side of posteriors first (first left and then right, or vice versa), and then go around the arch from left/right posterior section to the right/left posterior section; 2) similar to #1, but some other patients lift only one side of the posterior and then go around the arch; 3) similar to #1, but some patients lift from the buccal side rather than the lingual side of the posterior; 4) some patients lift from the anterior incisors and pull hard to remove the aligner; 5) some other patients grab both lingual and buccal side of a posterior location and pull out both sides at the same time; 6) some other patients grab a random tooth in the middle. The library can also include a removal guideline provided by the manufacturer of the aligner. Removal approach may also depend on presence or absence of attachments on teeth as some pf the above method may result in more comfortable way of removal. Based on the attachment situation on each tooth, it can be determined how each patient would probably remove an aligner and adapt that removal procedure for that patient in that specific simulation.

After an appliance is formed over a mold for a treatment stage, the appliance is removed from the mold (e.g., automated removal of the appliance from the mold), and the appliance is subsequently trimmed along a cutline (also referred to as a trim line). The processing logic may determine a cutline for the appliance. The determination of the cutline(s) may be made based on the virtual 3D model of the dental arch at a particular treatment stage, based on a virtual 3D model of the appliance to be formed over the dental arch, or a combination of a virtual 3D model of the dental arch and a virtual 3D model of the appliance. The location and shape of the cutline can be important to the functionality of the appliance (e.g., an ability of the appliance to apply desired forces to a patient's teeth) as well as the fit and comfort of the appliance. For shells such as orthodontic appliances, orthodontic retainers and orthodontic splints, the trimming of the shell may play a role in the efficacy of the shell for its intended purpose (e.g., aligning, retaining or positioning one or more teeth of a patient) as well as the fit of the shell on a patient's dental arch. For example, if too much of the shell is trimmed, then the shell may lose rigidity and an ability of the shell to exert force on a patient's teeth may be compromised. When too much of the shell is trimmed, the shell may become weaker at that location and may be a point of damage when a patient removes the shell from their teeth or when the shell is removed from the mold. In some embodiments, the cut line may be modified in the digital design of the appliance as one of the corrective actions taken when a probable point of damage is determined to exist in the digital design of the appliance.

On the other hand, if too little of the shell is trimmed, then portions of the shell may impinge on a patient's gums and cause discomfort, swelling, and/or other dental issues. Additionally, if too little of the shell is trimmed at a location, then the shell may be too rigid at that location. In some embodiments, the cutline may be a straight line across the appliance at the gingival line, below the gingival line, or above the gingival line. In some embodiments, the cutline may be a gingival cutline that represents an interface between an appliance and a patient's gingiva. In such embodiments, the cutline controls a distance between an edge of the appliance and a gum line or gingival surface of a patient.

Each patient has a unique dental arch with unique gingiva. Accordingly, the shape and position of the cutline may be unique and customized for each patient and for each stage of treatment. For instance, the cutline is customized to follow along the gum line (also referred to as the gingival line). In some embodiments, the cutline may be away from the gum line in some regions and on the gum line in other regions. For example, it may be desirable in some instances for the cutline to be away from the gum line (e.g., not touching the gum) where the shell will touch a tooth and on the gum line (e.g., touching the gum) in the interproximal regions between teeth. Accordingly, it is important that the shell be trimmed along a predetermined cutline.

FIG. 7C illustrates a method 750 of orthodontic treatment using a plurality of appliances, in accordance with embodiments. One or more of the plurality of appliances may be trimmed after automated removal from a mold (e.g., one or more of the plurality of appliances may be an untrimmed shell 150 that has been trimmed after automated removal from mold 140 using a shell removal device, as described herein). The method 750 can be practiced using any of the appliances or appliance sets described herein. In block 760, a first orthodontic appliance is applied to a patient's teeth in order to reposition the teeth from a first tooth arrangement to a second tooth arrangement. In block 770, a second orthodontic appliance is applied to the patient's teeth in order to reposition the teeth from the second tooth arrangement to a third tooth arrangement. The method 750 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

FIG. 8 illustrates a method 800 for designing an orthodontic appliance to be produced by direct fabrication, in accordance with embodiments. The method 800 can be applied to any embodiment of the orthodontic appliances described herein. Some or all of the blocks of the method 800 can be performed by any suitable data processing system or device, e.g., one or more processors configured with suitable instructions.

In block 810, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 820, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as Xray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In block 830, an orthodontic appliance configured to produce the force system is determined. Determination of the orthodontic appliance, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA(Abaqus) software products from Dassault Systèmes of Waltham, MA.

Optionally, one or more orthodontic appliances can be selected for testing or force modeling. As noted above, a desired tooth movement, as well as a force system required or desired for eliciting the desired tooth movement, can be identified. Using the simulation environment, a candidate orthodontic appliance can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 840, instructions for fabrication of the orthodontic appliance incorporating the orthodontic appliance are generated. The instructions can be configured to control a fabrication system or device in order to produce the orthodontic appliance with the specified orthodontic appliance. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming. In some embodiments, the instructions for fabrication of the orthodontic appliance include instructions for automated removal of the orthodontic appliance from a mold (e.g., automated removal of an untrimmed shell 150 from mold 140 using a shell removal device, as described herein).

Method 800 may comprise additional blocks: 1) The upper arch and palate of the patient is scanned intraorally to generate three dimensional data of the palate and upper arch; 2) The three dimensional shape profile of the appliance is determined to provide a gap and teeth engagement structures as described herein.

Although the above blocks show a method 800 of designing an orthodontic appliance in accordance with some embodiments, a person of ordinary skill in the art will recognize some variations based on the teaching described herein. Some of the blocks may comprise sub-blocks. Some of the blocks may be repeated as often as desired. One or more blocks of the method 800 may be performed with any suitable fabrication system or device, such as the embodiments described herein. Some of the blocks may be optional, and the order of the blocks can be varied as desired.

Figure 9:
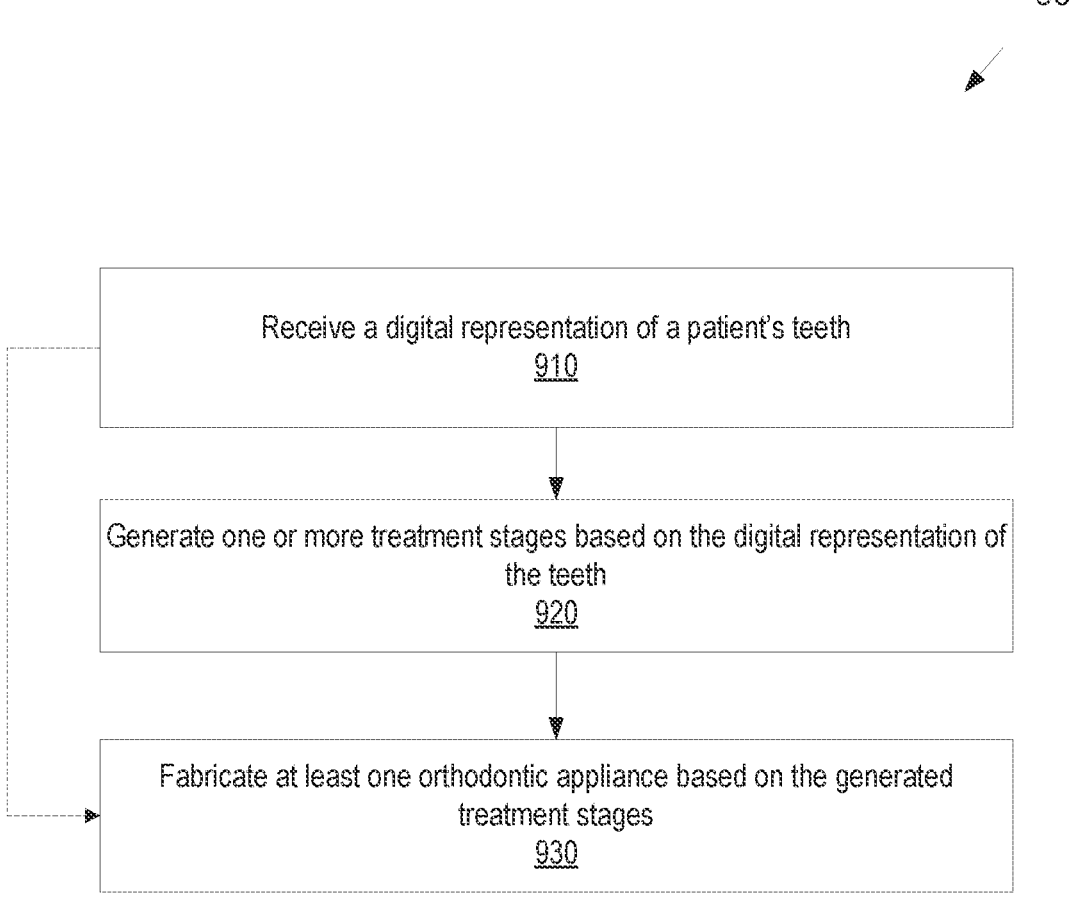
FIG. 9 illustrates a method for digitally planning an orthodontic treatment, according to certain embodiments.

FIG. 9 illustrates a method 900 for digitally planning an orthodontic treatment and/or design or fabrication of an appliance, in accordance with embodiments. The method 900 can be applied to any of the treatment procedures described herein and can be performed by any suitable data processing system.

In block 910, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 920, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 930, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired. The fabrication of the appliance may include automated removal of the appliance from a mold (e.g., automated removal of an untrimmed shell 150 from mold 140 using a shell removal device, as described herein).

In some instances, staging of various arrangements or treatment stages may not be necessary for design and/or fabrication of an appliance. As illustrated by the dashed line in FIG. 9, design and/or fabrication of an orthodontic appliance, and perhaps a particular orthodontic treatment, may include use of a representation of the patient's teeth (e.g., receive a digital representation of the patient's teeth at block 910), followed by design and/or fabrication of an orthodontic appliance based on a representation of the patient's teeth in the arrangement represented by the received representation.

It is to be understood that the above description is intended to be illustrative, and not restrictive. Many other embodiments will be apparent upon reading and understanding the above description. Although embodiments of the present disclosure have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A shell removal device comprising:
   a platform configured to secure a mold, wherein an untrimmed shell is formed over the mold;
   a clamping mechanism comprising a first distal portion extending from a side of a body of the shell removal device, wherein the clamping mechanism further comprises a second distal portion that is configured to insert into a cover of the shell removal device to releasably secure to the cover to secure the untrimmed shell between the body and the cover, the platform being disposed in the body; and
   a drive mechanism configured to cause the mold secured to the platform and the untrimmed shell secured between the body and the cover via the clamping mechanism to separate from each other responsive to sensor data of a sensor of the shell removal device, the sensor data indicative that the untrimmed shell has begun to separate from the mold.

2. The shell removal device of claim 1, wherein the sensor data is indicative of a pressure differential between an upper surface of the untrimmed shell and a lower surface of the untrimmed shell, and wherein the pressure differential causes the untrimmed shell to begin to separate from the mold.

3. The shell removal device of claim 2 further comprising a housing coupled to a media inlet, wherein the platform is disposed within the housing, wherein pressurized media is to enter the housing via the media inlet to cause the pressure differential between the upper surface of the untrimmed shell and the lower surface of the untrimmed shell.

4. The shell removal device of claim 1, wherein the sensor data is indicative that at least a portion of the untrimmed shell has moved a threshold distance away from one or more of the mold or the platform.

5. The shell removal device of claim 1, wherein the sensor comprises one or more of a piezoelectric pressure transducer, a strain gauge pressure sensor, a variable capacitance pressure transducer, an audio sensor, an optical sensor, a pressure sensor, or a contact sensor.

6. The shell removal device of claim 1, wherein the mold corresponds to a dental arch of a patient and the untrimmed shell is an untrimmed aligner.

7. A method comprising:
   securing a mold to a platform of a shell removal device, wherein an untrimmed shell has been formed over the mold;
   releasably securing a clamping mechanism extending from a side of a body of the shell removal device to a cover of the shell removal device to secure the untrimmed shell between the body and the cover, the platform being disposed in the body, wherein the clamping mechanism comprises a first distal portion extending from the side of the body and a second distal portion that is configured to insert into the cover to releasably secure to the cover to secure the untrimmed shell between the body and the cover; and
   causing, via a drive mechanism, the mold secured to the platform and the untrimmed shell secured between the body and the cover via the clamping mechanism to separate from each other responsive to sensor data of a sensor of the shell removal device, the sensor data indicative that the untrimmed shell has begun to separate from the mold.

8. The method of claim 7, wherein the sensor data is indicative of a pressure differential between an upper surface of the untrimmed shell and a lower surface of the untrimmed shell, and wherein the pressure differential causes the untrimmed shell to begin to separate from the mold.

9. The method of claim 8, wherein a housing is coupled to a media inlet, wherein the platform is disposed within the housing, the method further comprising causing pressurized media to enter the housing via the media inlet to cause the pressure differential between the upper surface of the untrimmed shell and the lower surface of the untrimmed shell.

10. The method of claim 7, wherein the sensor data is indicative that at least a portion of the untrimmed shell has moved a threshold distance away from one or more of the mold or the platform.

11. The method of claim 7, wherein the sensor comprises one or more of a piezoelectric pressure transducer, a strain gauge pressure sensor, a variable capacitance pressure transducer, an audio sensor, an optical sensor, a pressure sensor, or a contact sensor.

12. The method of claim 7, wherein the mold corresponds to a dental arch of a patient and the untrimmed shell is an untrimmed aligner.

13. A system comprising:
   a memory; and
   a processing device coupled to the system, the processing device to:
   receive, from a sensor of a shell removal device, sensor data indicative of an untrimmed shell separating from a mold disposed on a platform of the shell removal device, the untrimmed shell being formed over the mold, a clamping mechanism of the shell removal device comprising a first portion extending from a side of a body of the shell removal device and a second distal portion that is configured to insert into a cover of the shell removal device to releasably secure to the cover to secure the untrimmed shell between the body and the cover, the platform being disposed in the body; and cause, based on the sensor data, a drive mechanism to cause the mold secured to the platform and the untrimmed shell secured between the body and the cover via the clamping mechanism to separate from each other.

14. The system of claim 13, wherein the sensor data is indicative of a pressure differential between an upper surface of the untrimmed shell and a lower surface of the untrimmed shell, and wherein the pressure differential causes the untrimmed shell to begin to separate from the mold.

15. The system of claim 14, wherein a housing coupled to a media inlet, wherein the platform is disposed within the housing, wherein pressurized media is to enter the housing via the media inlet to cause the pressure differential between the upper surface of the untrimmed shell and the lower surface of the untrimmed shell.

16. The system of claim 13, wherein the sensor data is indicative that at least a portion of the untrimmed shell has moved a threshold distance away from one or more of the mold or the platform.

17. The system of claim 13, wherein the sensor comprises one or more of a piezoelectric pressure transducer, a strain gauge pressure sensor, a variable capacitance pressure transducer, an audio sensor, an optical sensor, a pressure sensor, or a contact sensor.

18. The system of claim 13, wherein the mold corresponds to a dental arch of a patient and the untrimmed shell is an untrimmed aligner.

* * * * *